United States Patent [19]

Tanaka et al.

[11] Patent Number: 5,155,581
[45] Date of Patent: Oct. 13, 1992

[54] ELECTRONIC STILL VIDEO CAMERA

[75] Inventors: Yoshito Tanaka; Yoshihiro Tanaka; Nobuyuki Taniguchi; Takeo Hoda; Shinji Tominaga; Motonobu Matsuda, all of Osaka, Japan

[73] Assignee: Minolta Camera Kabushiki Kaisha, Osaka, Japan

[21] Appl. No.: 347,925

[22] Filed: May 5, 1989

[30] Foreign Application Priority Data

May 6, 1988 [JP] Japan ................. 63-110969
Oct. 6, 1988 [JP] Japan ................. 63-253464

[51] Int. Cl.⁵ ........................................... H04N 9/73
[52] U.S. Cl. ........................................... 358/29
[58] Field of Search ............... 358/29, 211, 225, 228, 358/909

[56] References Cited

U.S. PATENT DOCUMENTS

| | | | |
|---|---|---|---|
| 4,499,487 | 2/1985 | Takayama et al. | 358/29 C |
| 4,584,598 | 4/1986 | Kutaragi | 358/29 C |
| 4,739,409 | 4/1988 | Baumeister | 358/228 |
| 4,879,600 | 11/1989 | Ise et al. | 358/228 |
| 4,918,519 | 4/1990 | Suzuki et al. | 358/909 |

FOREIGN PATENT DOCUMENTS

| | | | |
|---|---|---|---|
| 10882 | 1/1985 | Japan | 358/211 |
| 128694 | 6/1986 | Japan . | |

Primary Examiner—John W. Shepperd
Attorney, Agent, or Firm—Burns, Doane, Swecker & Mathis

[57] ABSTRACT

An electronic still video camera includes photography means having video signal production means for producing a video signal with respect to an object, color balance adjustment means for fixedly adjusting the color balance of the video signal of said video signal production means to a color temperature for daylight, judge means for judging as to whether an object is able to be photographed without flash light, and flash firing means for firing flash light when said judge means judges that flash light is necesary. The electronic still video camera can simplify the construction of color balance circuit.

3 Claims, 20 Drawing Sheets

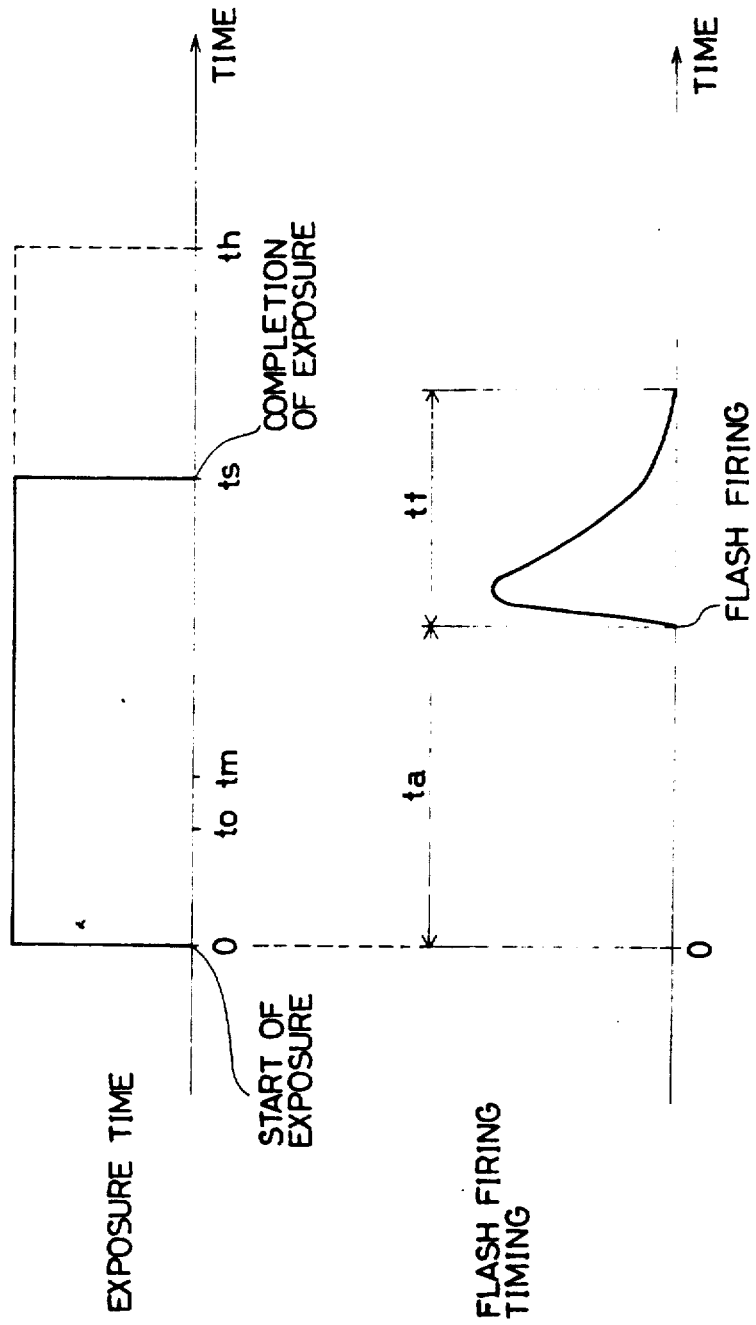

ELECTRONIC STILL VIDEO CAMERA

BACKGROUND OF THE INVENTION AND RELATED ART STATEMENT

The present invention relates to an electronic still video camera.

Flash light has been used for giving a proper amount of light to a low bright object to compensate the lack of photography light, or for applying exposure correction to an object with a bright background (back light) or low contrast to correct the contrast of objects.

In video cameras, on the other hand, it is known that variations of color temperature of irradiation light cause the color balance of an image to vary. In view of the fact, there have been provided video cameras carrying an automatic white balance device capable of automatically adjusting the color balance according to the color temperature of light source so that the color balance of image is not influenced by the variation of color temperature. However, such an automatic white balance device is complicated in circuit construction.

Several devices have been proposed to simplify the circuit construction for white balance. For example, Unexamined Japanese Patent Publication No. 58-147721 discloses a device including a manual changer for manually changing from a daylight photography mode having a specific color temperature for daylight to a fluorescent/tungsten light photography mode having a specific color temperature for fluorescent/tungsten light and vice versa. In the device, also, when the completeness of charging of a flash is detected, the photography mode is forcibly set in the daylight photography mode from the fluorescent/tungsten light photography mode. In other words, in the device, the mode change is required to be carried out by hands. Also, even if the fluorescent/tungsten light photography mode is desired, when the flash charging is completed, the photography mode is forcibly changed to the daylight mode proper to flash light.

Further, Unexamined Japanese Patent Publication No. 63-59290 discloses a camera capable of detecting the color temperature and automatically executing white balance in which when the flash charging is completed, the specific color temperature of white balance is set in a fixed color temperature, e.g., daylight.

Moreover, Unexamined Japanese Patent Publication No. 58-149033 discloses a camera carrying a flash capable of firing a light having a desired color temperature.

However, in the above-mentioned conventional devices, the white balance device is changed according to the color temperature of an object. Consequently, it is necessary to provide changing means. Accordingly, it will be apparent that the conventional devices have limits in simplification.

SUMMARY OF THE INVENTION

The present invention has overcome the above-mentioned drawbacks and has an object of providing an electronic still video camera which makes it possible to fixedly adjust the specific color temperature of white balance for daylight and assures a simplified white balance circuit.

An electronic still video camera of the present invention includes photography means having video signal production means for producing a video signal with respect to an object, color balance adjustment means for fixedly adjusting the color balance of the video signal of said video signal production means to a color temperature for daylight, judge means for judging as to whether an object is able to be photographed without flash light; and flash firing means for firing flash light when said judge mans judges that flash light is necessary.

Also, an electronic still video camera of the present invention includes color temperature information output means for outputting information concerning the color temperature of an object, judge means for judging as to whether the color temperature of the object is outside a color temperature for daylight, and flash control means for issuing a flash firing signal when said judge means judges that the color temperature of the object is outside the color temperature for daylight.

Further, an electronic still video camera of the present invention includes photography means having video signal production means for producing a video signal with respect to an object, a color balance adjustment device for adjusting the color balance of the video signal of said video signal production means, a flash device for firing flash light, mode change means for changing the photography mode form a first photography mode to a second photography mode and vice versa, color temperature information output means for outputting information concerning the color temperature of the object, a judge device for judging as to whether flash light is necessary, flash control means for permitting the flash firing of said flash device when the photography mode is set in the first photography mode and said judge device judges that flash light is necessary, prohibiting the flash firing when said judge device judges that flash light is not necessary, and prohibiting the flash firing regardless of the judgement of said judge device when the photography mode is set in the second photography mode, a color balance control device for controlling said color balance adjustment device so as to fixedly adjust the color balance of the video signal to a color temperature for daylight when the photography mode is set in the first photography mode, and controlling said color balance adjustment device so as to change the color balance of the video signal according to the information from said color temperature information output means when the photography mode is set in the second photography mode.

Accordingly, the electronic still video camera of the present invention in which the color balance of the video signal is fixedly adjusted to a color temperature for daylight and flash firing means is fired when flash light is necessary can eliminate such changing means as the conventional cameras and thus can simplify color balance circuit.

These and other objects, features and advantages of the present invention will become more apparent upon a reading of the following detailed description and drawings.

BRIEF DESCRIPTION OF THE DRAWINGS

FIG. 3 is a time chart for illustrating the exposure time as related with the flash firing timing;

DESCRIPTION OF PREFERRED EMBODIMENTS

Figure 1A:
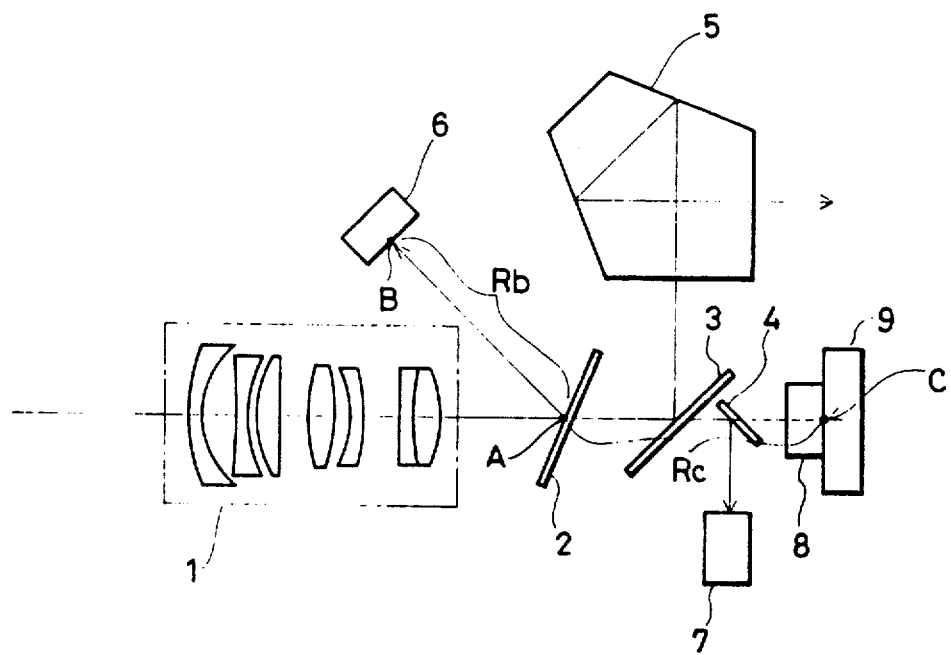
FIG. 1A is a diagram showing the optical system of an electronic still video camera embodying the invention.

FIG. 1A is a diagram showing the construction of the optical system of an electronic camera embodying the invention. The drawing shows an objective lens 1 including a zooming element, a half mirror 2 having a low reflectance for guiding a portion of the light through the lens 1 to a light measuring sensor 6, a main mirror 3 having a half mirror portion only centrally thereof and a total reflection mirror portion surrounding the half mirror portion for directing the light through the mirror 2 toward a pentagonal roof prism 5, a submirror 4 for totally reflecting the light through the center of the main mirror 3 and directing the reflected light toward a focus sensor 7, the above-mentioned prism 5 for directing the light reflected at the main mirror 3 toward a viewfinder (not shown), an optical low-pass filter 8, and a solid-state image pickup device 9 having a shutter function described later.

Figure 1B:
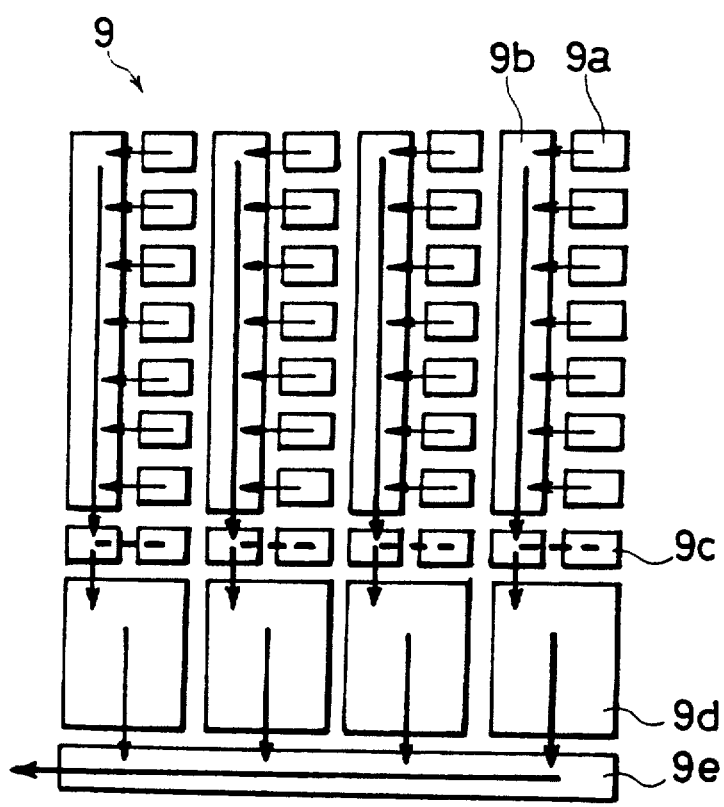
FIG. 1B is a diagram showing the construction of a solid-state image pickup device used in the electronic still video camera of FIG. 1A.

The solid-state image pickup device 9 includes, as shown in FIG. 1B, a number of photoelectric conversion elements 9a such as photodiode, vertical shift registers 9b, selective gates 9c, analog memories 9d, and a horizontal shift register 9e. The photoelectric conversion elements 9a are arranged in the form of a matrix. The vertical shift registers 9b are provided for respective vertically-arranged element groups each consisting of a given number of photoelectric conversion elements 9a. The electric charge or image signal stored in the photoelectric conversion elements 9a is transferred to the vertical shift register 9b every one field. The selective gate 9c receives a control signal to allow image signals stored in the vertical shift register 9b to transfer to the analog memory 9d in lumps. The image signals stored in the analog memory 9d are transferred every one line to the horizontal shift register 9e in accordance with horizontal synchronizing signals, and then stored in an image signal memory circuit.

The light measuring sensor 6 comprises photoelectric conversion elements (e.g. SPCs) and includes two sensor portions for measuring light at the central spot of the image area to be photographed and for measuring light at the portion of the image area around the central spot. The sensor 6 is so disposed that the distance Rb from the reflecting point A of the half mirror 2 to the measuring point B of the sensor 6 is equal to the distance Rc from the reflecting point A to the image pickup point C of the pickup device 9, and that the measurement by the sensor 6 will be equivalent to the measurement at the image pickup surface of the device 9. The sensor 6 is further so positioned that the light incident thereon will not be block regardless of whether the main mirror 3 is raised or lowered, and that the light can be thereby measured also during the exposure of the device 9 with the mirror 3 in its raised position.

The focus sensor 7, for example, has two CCD line sensors for individually receiving images from different exit pupils of the objective lens to detect the displacement or the amount of defocusing by detection the difference in phase between the two images.

When the photographer half-depresses the shutter release button of the camera having the above construction, an unillustrated system controller calculates the amount of defocusing from the output of the focus sensor 7, and the objective lens 1 is driven in accordance with the calculated amount to focus the lens. When the object is thus focused, the measuring sensor 6 measures the luminance of the object. Based on the luminance data obtained, the system controller calculates the duration of charge storage (i.e. shutter opening duration) by the image pickup device 9, determines whether flashlight is necessary and computes the flash light emitting timing. When the photographer pushes the shutter button by full depression, the main mirror 3 is swung up, the submirror 4 is folded on the bottom surface of the main mirror, and exposure of the device 9 is initiated. Thus, the device 9 starts storing charges. Simultaneously with the charge storage, the sensor 6 starts measuring the light. Upon the sensor 6 detecting the measurement reaching a proper exposure value, the charge storage by the pickup device 9 is discontinued and the stored charges are transferred to an analog memory unit, whereby the object is completely photographed.

Although the present embodiment has the construction of a single-lens reflex camera, the solid-state image pickup device 9 has a shutter function, while the aperture diaphragm stopping-down mechanism is omitted from the embodiment to provide a compact camera with a simplified construction. Accordingly, the main mirror 3 and the submirror 4 disposed in front of the device 9 are so designed as to completely shield the low-ass filter 8 and the device 9 from light. This eliminates the likelihood that the color filter (not shown) provided on the front side of the device 9 will be faced or scorched when exposed to a high-luminance object (e.g. the sun) focused thereon or to light for a prolonged period of time. Additionally the device 9 is prevented from storing charges uselessly except when the shutter button is depressed.

In the present embodiment having the construction of a single-lens reflex camera, the main mirror 3 and the submirror 4 are given the shielding function. On the other hand, in cameras not having the construction of a single-lens reflex camera, a shielding member may be provided at an appropriate position.

Figure 2A:
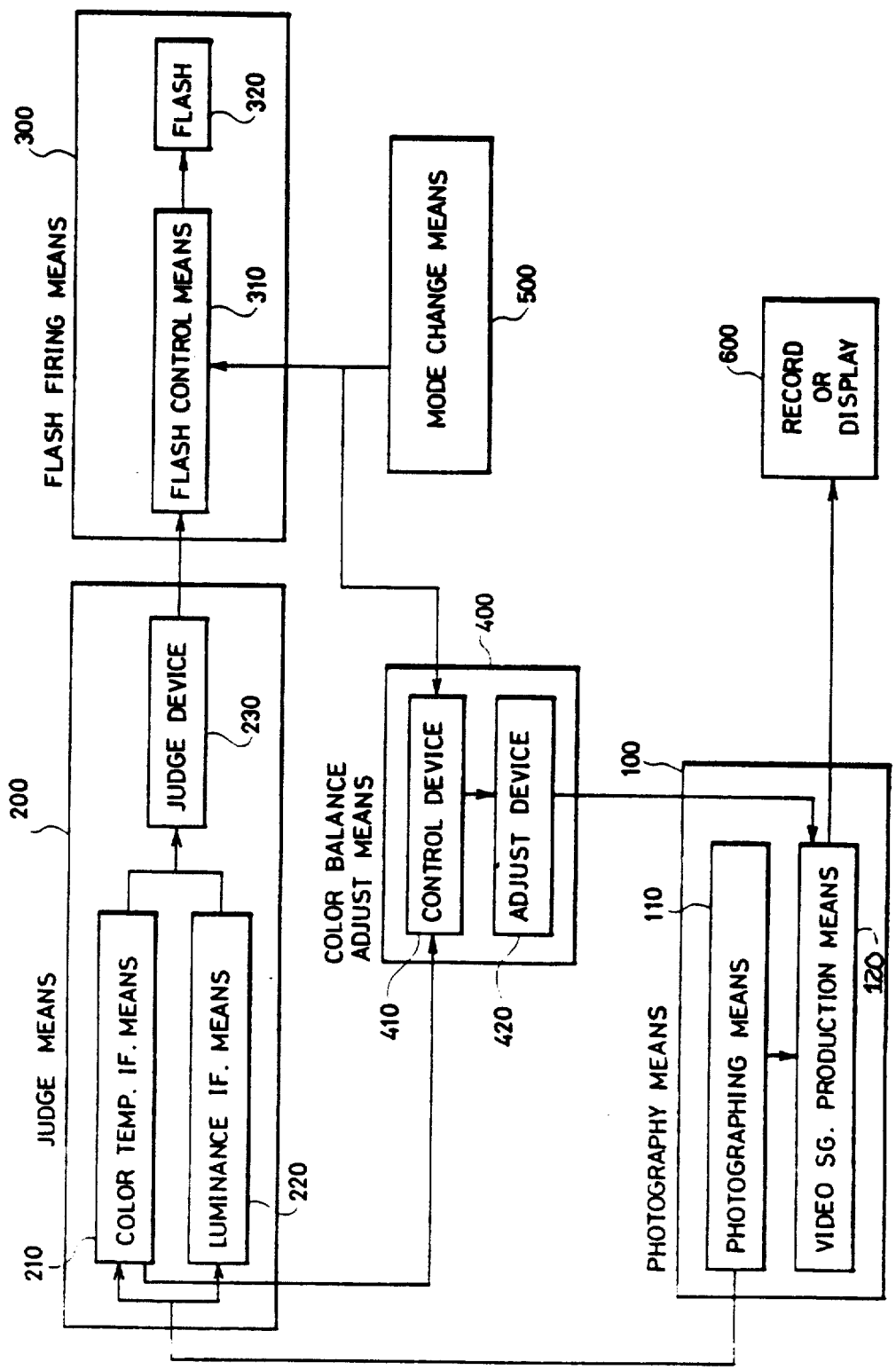
FIG. 2A is a block diagram showing an basic construction of the electronic still video camera.

Referring to FIG. 2A showing a basic construction of the electronic still video cameras, the electronic still video camera broadly includes photography mans 100, judge means 200, flash firing means 300, and color balance adjustment means 400. The photography means 100 has photographing means 110 and video signal production means 120 for producing video signals with respect to an object. The judge means 200 has color temperature information output means 210, luminance information output means 220, and a judge device 230. The flash firing means 300 has flash control means 310 and an electronic flash device 320. The color balance adjustment means 400 has a control device 410 and an adjustment device 420. Indicated at 500 is mode change means for changing the photography mode of the electronic still video camera from a first photography mode to a second photography mode and vice versa. Indicated at 600 is peripheral means for recording the video signals or displaying an image in accordance with the video signals.

The color temperature and luminance information are respectively obtained by the color temperature information output means 210 and luminance information output means 220 from the photographing means 110. The judge means 200 judges as to whether flash light is necessary. If the judge means 200 judges that flash light is necessary, the flash firing means 300 is fired.

Also, the judge device 230 judges based on information from the color temperature information output means 210 or the luminance information output means 220 as to whether flash light is necessary, the flash firing means 300 is fired. The judge device 230 judges that flash light is necessary when the color temperature of the object is outside the color temperature for daylight, or when the luminance of the object is smaller than a predetermined luminance.

The flash control means 310 permits the flash firing of the flash electronic device 320 when the photography mode is set in the first photography mode and the judge device 230 judges that flash light is necessary. The flash control means 310 prohibits the flash firing when the judge device 310 judges that flash light is not necessary. The flash control means 310 prohibits the flash firing regardless the judgement of the judge device 230 when the photography mode is set in the second photography mode.

The color balance adjustment means 400 fixedly adjusts the color balance of the video signal of the video signal production means 120 to a color temperature for daylight.

Also, the control device 410 controls the color balance adjustment device 420 so as to fixedly adjust the color balance of the video signal to a color temperature for daylight when the photography mode is set in the first photography mode. The control device 410 controls the color balance adjustment device 420 so as to change the color balance of the video signal according to the information from the color temperature information output means 210 when the photography mode is set in the second photography mode.

Figure 2B:
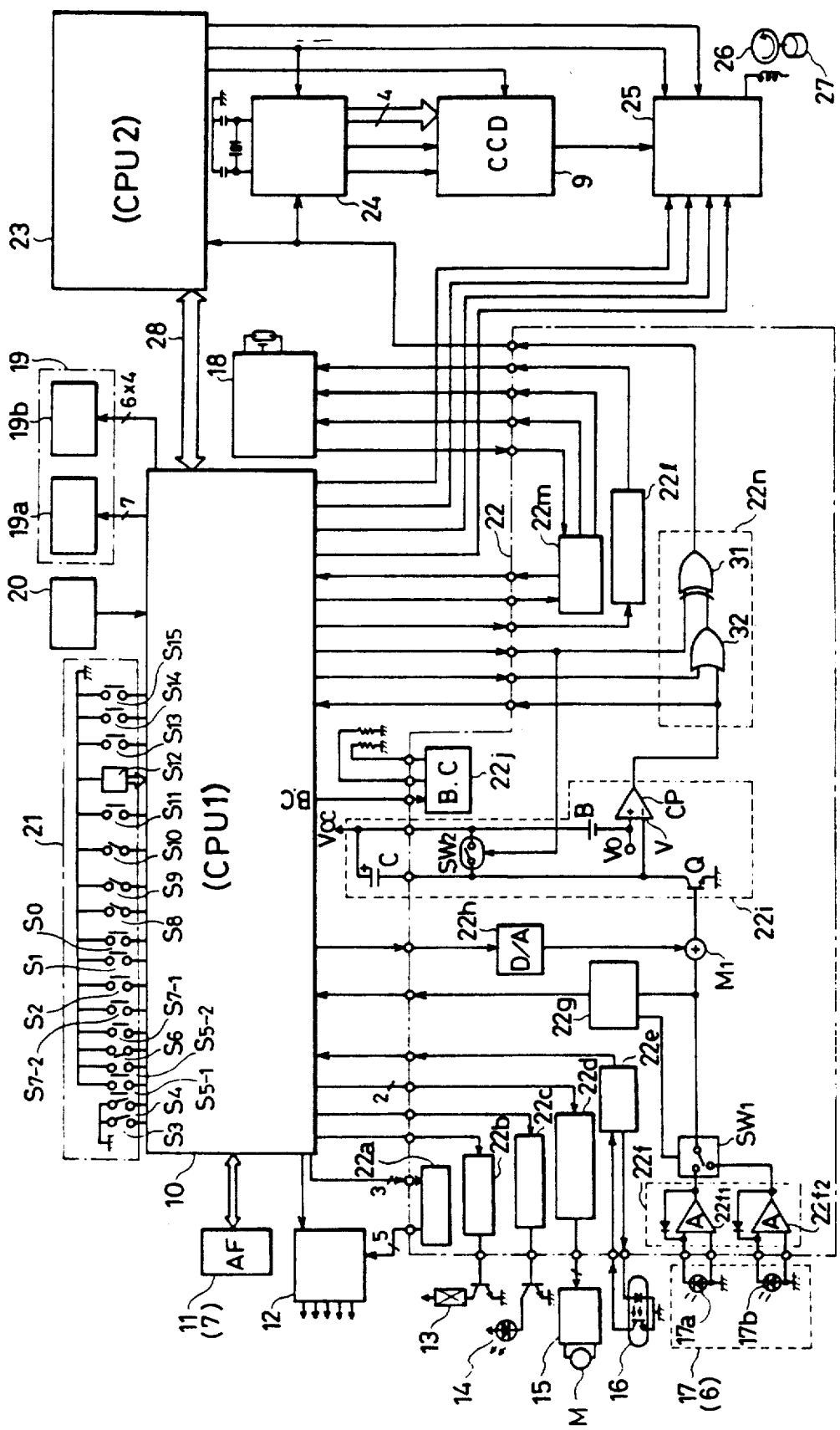
FIG. 2B is a systematic diagram of the electronic still video camera.

FIG. 2B shows the systematic construction of the present embodiment. With reference to the drawing, indicated at 10 is a system controller (CPU 1) for controlling the overall sequence of the camera unit, and at 23 a system controller (CPU 2) of the sequence of a video unit. A control circuit block 11 comprises focus detecting CCD line sensors and an interface circuit for driving the lens for automatic focusing (AF) and controlled its charge storage function and the function of outputting the stored charges successively on A/D conversion according to AF sequence of the system controller 10. Indicated at 12 is a DC/DC converter for producing different power supply voltages for circuit blocks for power supply, at 13 a clutch circuit for selectively supplying the power of a motor M to the objective lens 1 or to the main mirror 3 and the submirror 4, at 14 light sources including an auxiliary light source (LED) for marking it possible to detect a focussing condition of a dark object by giving a light-dark contrast to the object, and LED or like light source for indicating the operation of a self-timer by flickering, at 15 an IC for driving the motor M, and at 16 a photocoupler for generating a number of pulses according to the amount of drive of the objective lens. A light measuring sensor 17 includes a sensor 17a for measuring the luminance of the center of the image to be photographed as a spot, and a sensor 17b for measuring the luminance of the image except at the center thereof. Indicated at 18 is a flash circuit, at 19 a display circuit having an LED display circuit 19a within the viewfinder and an LED display circuit 19b on the top of the camera body, at 20 a color temperature sensor circuit for measuring the color temperature of the light source illuminating the object, and at 21 switches including switches operatively connected to the shutter release button and a ode changing switch.

The switches 21 includes the following ones. A main switch S0 prohibits the operation of the camera when it is opened. Indicated at S1 is a switch for starting light measurement for AE (automatic exposure) and AF (automatic focusing), and at S2 a release start switch.

The image pickup sensitivity (i.e. output voltage sensitivity to a given amount of exposure), corresponding to the ISO sensitivity of the film, of solid-state image pickup divices 9 differs form device to device. Switchs S3, S4 set an amount of correction in accordance with the variation in the sensitivity of the device 9 during the fabrication of the camera. These switches S3, S4 produce 2-bit signals (A, B), and correction values corresponding to the respective signals are stored in the system controller 10. When a 2-bit signal (A, B) is fed to the system controller 10, the controller 10 outputs a correction value $\gamma$ Ev corresponding to that signal, whereby the luminance measured by the light measuring sensor 17 is corrected. More specifically, the shutter closing timing is controlled based on the measurement obtained by the sensor 17a which measures light simultaneously with the photographing operation, so that the measurement data, if corrected, controls the shutter speed for the correction of the pickup sensitivity. For example, the following correction values are stored in the controller 10. (0, 0)=0.0 Ev, (0, 1)=±0.3 Ev, (1, 0) = −0.3 Ev, and (1, 1)=±0.5 Ev. If the image pick up sensitivity of the device 9 is 0.3 Ev greater than a predetermined desired value, the 2-bit signal (0, 1) is fed to the controller 10, which in turn outputs the correction value $\gamma$ of +0.3 Ev corresponding to (0, 1), whereby the luminance measured by the light measuring sensor 17 is corrected by +0.3 Ev, increasing the shutter speed by +0.3 Ev and decreasing the amount of exposure by 0.3 Ev. Thus, the variation of the pickup sensitivity is corrected. An increased number of switch may be used to use an increased number of bits, and correction values stored in corresponding relation to the bit signals. Correction can then be made more minutely.

A data switch S5 comprises a first switch S5-1 for specifying date data as to the year, month, day, hour and minute, and a second switch S5-2 for setting or correcting the specified date data. A switch S6 detects a deck closure in its closed or opened position. Indicated at S7-1 is a floppy sensor switch for checking whether a video signal recording floppy disc cartridge is loaded in the camera in the deck, and at S7-2 is a writing prohibition sensor switch for checking whether writing prohibition is selected by detecting a writing prohibition selecting lug (safety lug) on the disc cartridge.

A switch S8 checks whether a slide copier as an accessory is connected to the camera. A switch S9 checks whether a negative copier as an accessory is connected to the camera.

Indicated at S10 is a switch for detecting a reproduction mode, and at S11 is a field/frame change switch for changing the image recording format to field or frame. Zoom encoder switches S12 are used for monitoring the focal length of the zoom lens.

Indicated at S13 is a forced firing emitting switch for forcibly firing the flash regardless of the luminance of the object, at S14 a firing prohibition switch for forcibly preventing the flash from firing, and at S15 a single/self-timer photographic mode change switch.

A control IC 22 has control circuits for controlling the operation of the DC/DC converter 12, clutch 13, etc. in response to control signals from the system controller 10, control circuits for controlling the shutter speed of the image pickup device 9 and the firing or triggering timing of the flash circuit 18, an A/D conversion circuit for the light measurement data obtained by the light measuring sensor 17, a proper exposure detecting circuit, etc.

More specifically, the control IC 22 has the following circuits. A voltage control circuit 22a controls the operation and increased voltage of the DC/DC converter 12 in response to DC/DC control signals. A clutch control circuit 22b on-off controls the clutch 13 in response to clutch control signals. A self timer control circuit 22c controls the emission of light by the light source 14 for indicating a self timer mode in response to a self control signal. A motor control circuit 22d controls the starting of the motor M in response to a motor control signal. A photointerrupter circuit 22e counts the number of pulses produced from the photocoupler 16 in accordance with the amount of rotation of the lens and feeds the count to the system controller 10. Amplifier circuits 22f1 and 22f2 respectively convert the output currents of the spot light measuring sensor 17a and the peripheral light measuring sensor 17b to voltage signals on logarithmic compression and feed the signals to a double integration control circuit 22g via a switch SW1. The control circuit 22g changes over the switch SW1, converts analog signals from the amplifier circuits 22f1, 22f2 to digital signals and feeds the signals to the system controller 10.

A proper exposure detecting circuit 22i detects the amount of exposure initiated for the solid-state image pickup device 9 in response to "shutter open" signal reaching a proper value form the measurement signal form the sensor 17a. The circuit 22i comprises a transistor Q having a base connected to a common terminal of the switch SW1 via an adder M1, a grounded emitter and a collector connected to the inverted input terminal of a comparator CP and to the negative electrode of a capacitor C. The positive electrode of the capacitor C is connected to a power supply terminal Vcc (not shown). The terminal Vcc is connected to the positive terminal of a constant-voltage source B, the negative terminal of which is connected to the non-inverted input terminal of the comparator CP. A switch SW2 connected between the positive and negative electrodes of the capacitor C is opened in response to the "shutter open" signal from the system controller 10.

When the switch SW2 is opened by the "shutter open" signal, the capacitor C is charged with the collector current of the transistor Q. When the potential (V) at the negative electrode of the capacitor C drops below the non-inverted input terminal voltage (Vo) of the comparator CP, the output of the comparator CP is inverted to detect proper exposure is attained. The resulting detection signal is fed as a shutter closing signal to the system controller 10 and to a shutter control circuit 22n.

A D/A conversion circuit 22h serves to convert the amount of correction of luminance, e.g. The amount of correction of ISO sensitivity variation described above, which is output by the system controller 10 from digital signal to analog signal. The correction signal is applied to the adder M1 and added to the incident light signal from the light measuring sensor 17.

A battery check circuit 22j checks the capacity of the battery. A flash trigger circuit 22l feeds a "flash firing" trigger signal to the flash circuit 18 in response to a flash firing signal received from the controller 10. In response to a "voltage increase starting" control signal, a flash control circuit 22m controls charging of an energy for the flash light emission to the main capacitor (to be mentioned as "charging of the flash circuit"). The circuit 22m also checks the flash circuit 18 for the charged state and delivers a charging completion signal to the system controller 10.

A shutter control circuit 22n produces shutter opening and closing signals. More specifically, the circuit 22n feeds shutter "open" and "close" control signals to the system controller 23 and a time control circuit 24 in response to a shutter "open" control signal from the controller 10 and a detection signal from the proper exposure detecting circuit 22i, or to a forced completion signal from the controller 10.

The time control circuit 24 controls the start and completion of exposure of the image pickup device 9 with the shutter "open" and "close" signals received from the shutter control circuit 22n. An image processing control circuit 25 adjusts image signals with an amount of gain correction received from the system controller 10 and color temperature data received from the system controller 23 and determines whether a single track or two tracks are used for recording according to a field/frame recording signal received from the controller 23. The amounts of gain correction, which will be described later in detail, are −1.0 Ev, −0.5 Ev, +0.5 Ev and +1.0 Ev. The amount is dependent on the mode selected, such as "front lighting", "back lighting", "beyond maximum distance", "flash mode" or "forced flash" details of which will be described later. Indicated at 26 are a recording magnetic head and disc. The disc 26 is drivingly rotated by a spindle motor 27. The system controller 23 delivers map data (as to empty tracks and recorded tracks) and switch acceptance reject data given by the controller 10 and indicating a recording operation being performed, the head being transported, etc.

Next with reference to the systematic diagram of FIG. 2, the shutter operation will be described primarily in respect of the shutter control circuit 22n for outputting shutter "open" and "close" signals, the proper exposure detecting circuit 22i and the system controller 10.

First, the system controller 10 feeds a shutter "open" signal "H" to the switch SW2, starting to charge the capacitor C of the detecting circuit 22i, and also to an EXOR circuit 31 in the shutter control circuit 22n. With a signal "L" applied to the other input terminal of the EXOR circuit 31, the circuit 31 feeds "H" to the time controller 24 and the system controller 23, initiating an exposure for the image pickup device 9. Only when flashlight is necessary, the system controller 10 starts measuring time simultaneously with the delivery of the shutter "open" signal to determine flash firing timing. On completion of time measurement, the controller 10 feeds a flash trigger signal to the flash trigger circuit 22/ to fire the flash.

Next, upon the detecting circuit 22i detecting attainment of a proper exposure, the comparator CP feeds a shutter "close" signal "H" to the system controller 10 and to an OR circuit 32, which in turn applies "H" output to the EXOR circuit 31. With the shutter "open" signal "H" already applied to one of the input terminals of the circuit 31, this circuit produces "L" output to notify the controller 23 and the time controller 24 of completion of exposure. If the detecting circuit 22i is to produce the shutter "close" signal later than specified time period after the shutter "open" signal (shutter speed is slower than a limit time for preventing a camera shake), the system controller 10 outputs a forced completion signal "H" to notify the completion of exposure in the same manner as above. Depending on the shutter "close" signal input timing from the shutter "open" signal output timing, forced completion signal output timing from the shutter "open" signal output timing (camera shake limit time) and "front lighting", "back lighting" or like mode (to be described in detailed later), the controller 10 calculates an increase or decrease in gain and feeds the result to the image processing control circuit 25.

Indicated at 28 is a communication line between the system controllers 10 and 23. Through this line, the controller 10 transmits switch data signals concerning, for example, S1, S2, date, reproduction, field/frame, slide copier, writing permission or writing prohibition, floppy detection, etc. and control signals for the on-off control of the spindle motor, the current track No., etc.

The exposure control mode is determined by considering the luminance of objects as will be described below with reference to Tale 1. As shown in this table, the exposure control modes are divided generally into "light" in which the level of the object luminance is higher than a predetermined level, i.e., in general, the object can be photographed only with available light, and "dark" in which the level is lower than the predetermined level, i.e., in general, which requires auxiliary light, i.e., flashlight. Each of "light" and "dark" modes is further divided into "front lighting" in which the image to be photographed has a proper balance in luminance between the main object and the background, i.e., subobject, and "back lighting (against the light)" wherein the main object is relatively lower than the background subobject in luminance, hence four modes in total. "Front lighting" includes a situation that the main object is extremely light as compared with the background.

For each of the four modes there are three photographic modes, i.e., "auto mode" wherein the need for flashlight is automatically determined from the light measurement obtained to select a proper method of photography, "forced flash mode" in which the flash is forcibly fired for photography regardless of the light measurement, and "no flash mode" in which the use of the flash is forsibly prohibited for photography even when the auxiliary light of flash is necessary. In the table, "forced flash" and "no flash" represent "forced flash mode" and "no flash mode", respectively, and "flash" or "AE (no flash)" represents the photographic mode to be selected in "auto mode".

When classified according to whether the flash is necessary, the foregoing photographic modes are divided into "available light mode" wherein available light only is used for photography without firing the flash, and "flash mode" wherein both available light and flashlight are used for photography. According to the classification of light measuring modes given in Table 1, "no flash" and "AE (no flash)" fall under "available light mode", and "forced flash" and "flash" under "flash mode".

TABLE 1

| | | Classification of Exposure Control | |
|---|---|---|---|
| Light | Back lighting | "Flash" (MAIN at ± O Ev, with background at 1 Ev) | |
| | | "Forced flash" (MAIN at ± O Ev) | |
| | | "No flash" (MAIN at −0.5 Ev) | |
| | Front lighting | "AE (no flash)" | |
| | | (Bvs' at ± O Ev) | |
| | | "Forced flash" (MAIN at ± O Ev) | |
| Dark | Back lighting | "Flash" (± O Ev with flash when MAIN is −1 Ev with available light only) | |
| | | "Forced flash" (MAIN at ± O Ev) | |
| | | "No flash" | AE |
| | | (MAIN at ± O Ev) | Display (low luminance) release lock |
| | Front lighting | "Flash" (± O Ev with flash when MAIN is −1 Ev with available light only) | |
| | | "Forced flash" (MAIN at ± O Ev) | |
| | | "No flash" | AE |
| | | (Bvs' at ± O Ev, beyond measurement limit. Bvs' at ± O Ev) | Display (low luminance) release lock |

(Note)
MAIN:luminance of main object
Bvs':average luminance value of image to be photographed A description will be given of the methods of photography in the photographic modes relative to the exposure control modes of the present embodiment.

(1) Available Light Mode

When objects are to be photographed against bright light in "no flash mode", the background, i.e. subobject, is relatively higher in luminance than the main object. If the main object is photographed with a proper amount of exposure, the background subobject appears bright. Accordingly, the contemplated view is so photographed that the exposure is discontinued when the main object has been exposed to light properly with the luminance measurement of the main object corrected by +0.5 Ev. The main object is then photographed by an exposure 0.5 Ev lower than the proper exposure value, whereas the photographed background will not appear exceedingly bright, with the result the photograph appears beautiful in its entirely.

When objects are to be photographed against dark light in "no flash mode", the luminance of the background subobject, although higher than that of the main object, is low. Accordingly even if the main object is photographed with a proper exposure, the background subobject photographed will not appear exceedingly bright. In this case, wherefore, the view is photographed with a proper exposure given to the main object without correcting them luminance measurement of the main object.

When photographs are to be taken with dark front lighting in "no flash mode" and also with bright front lighting in "AE (no flash) mode", the main object is generally properly balanced with the subobject in luminance, with the entire image area involving variations in luminance. To give consideration to both the luminance of the main object and that of the subobject in these cases, a weighted average of these luminance values, Bvs', is taken, and photographs are taken with a proper exposure determined for the average luminance. If the luminance of the overall image area is so low that it is close to the limit value of measurement, the average luminance is determined with the luminance of the subobject more weighted than that of the main object. Further if the luminance of the image area is exceedingly lower than the measurement limit value, the release button is locked to prohibit photographic operation.

(2) Flash Mode

In "forced flash mode" included in this mode, it is thought that the photographer intends to take photographs with use of flashlight regardless of the luminance of the main object, so that the flash is fired in response to a shutter "open" control signal to photograph the main object with the contemplated amount of exposure regardless of the exposure control mode classification.

In the case of "flash" mode in "light, back lighting" (hereinafter referred to as "back light flash mode"), the luminance measurement of the subobject is corrected by $-1.0$ Ev to calculate a proper exposure time for the subobject. Assuming that the apex value of the exposure time involving the correction of $-1.0$ Ev is Tv, exposure is made with available light during the exposure time Tv after the start of photographic operation, the flash is then fired, and the exposure is discontinued when a proper amount of exposure is given to the main object. In other words, the background is first photographed with available light 1 Ev more brightly than properly, and the main object is subsequently photographed properly with flashlight. The main object can then be photographed beautifully with the subsubject photographed bright to given an atmosphere of back lighting to the photograph.

In the case of "dark, back lighting" and "dark, front lighting" (i.e. flash mode in the dark, hereinafter referred to as "dark flash mode"), the luminance measurement of the main object is corrected by $+1.0$ Ev to calculate a proper exposure time for the main object. Assuming that the apex value of the exposure time involving the correction of $+1.0$ Ev is Tv, exposure is made with available light during the exposure time Tv following the start of photographic operation, the flash is then fired, and the exposure is discontinued when a proper amount of exposure is given to the main object. Thus, the main object is first photographed with available light 1 Ev less bright than properly and then photographed with flashlight properly.

According to the embodiment described above, the exposure time determining the flash firing timing is calculated by the system controller 10 separately for "back lighting flash mode" and "dark flash mode", and is measured simultaneously with the start of exposure of the solid-state image pickup device 9. The flash firing timing, which is thus calculated from the light measurement data obtained in advance, may alternatively be determined by directly measuring, simultaneously with the exposure of the device 9, the luminance of the subobject for "back lighting flash mode" or the luminance of the main object for "dark flash mode". Stated more specifically, in "back lighting flash mode", the luminance of the subobject is directly measured with the start of exposure of the device 9, and when the resulting measurement has exceeded a proper value of 1.0 Ev, the flash is fired. The exposure is completed when a proper amount of exposure is given for the main object. In "dark flash mode", the luminance of the main object is directly measured with the start of exposure of the device 9, the flash is fired when a measurement is obtained which is 1.0 Ev less than a proper value, and the exposure is completed when a proper amount of exposure is given for the main object.

Next, a description will be given of the above classification of exposure control modes according to the luminance of objects detected by the light measuring sensor 17.

The light measuring sensor 17 comprises two sensors, i.e. The sensor 17a for measuring the luminance of central spot of the image area to be photographed, and the sensor 17b for measuring the luminance of peripheral portion of the image area. Thus, the sensor 17 is adapted to measure the luminance of the main object and that of the subobject separately since it is generally likely that, for example, when a person is to be photographed, the person, i.e. the main object, will be positioned centrally of the image area to be photographed against the surrounding background, i.e. The subobject.

Suppose the luminance of central portion of the image area measured by the sensor 17a (hereinafter referred to as "central luminance") is Bv1, the luminance of peripheral portion of the area measured by the sensor 17b (hereinafter referred to as "peripheral luminance") is Bv2, the luminance of the main object is Bvs, and the luminance of the subobject is Bva. The measurement Bv2 is usable as the luminance Bva of the subobject such as the background, whereas the measurement BV1 involves an error if used as the luminance Bvs of the main object as already known. For example, if the main object is small relative to the image area and is positioned against the light, the measurement BV1 is greater than the luminance Bvs of the main object since the main object is affected by the background light. Further if the ratio of the size of the main object is altered as desired relative to the image area to be photographed, using a zoom lens as the objective lens, the error of the measurement Bvs relative to the main object luminance Bvs varies with the ratio. Accordingly, there arises a need to correct the measurement Bv1 for use as the main object luminance Bv1 in accordance with the ratio of the size of the main object relative to the image area and with the difference in luminance between the main object and the subobject. Assuming that the amount of correction is $\alpha$, the luminance Bvs of the main object is expressed by:

$$Bvs = Bv1 - \alpha \qquad (1)$$

The luminance of the object is expressed in Ev value.

Table 2 is an $\alpha$ map showing amounts of correction $\alpha$. Represented by $\beta$ is the magnification indicating the size of the object relative to the image area to be photographed, and by $\Delta Bv$ is the difference between the peripheral luminance Bv2 and the central luminance Bv1, that is, $\Delta Bv = Bv2 - Bv1$. With reference to the table, as $\beta$ decreases with a decrease in the ratio of size of the main object tot he image area, the amount of correction $\alpha$ increases since the amount of light impinging on the light measuring sensor 17a from the peripheral object increases. Further as ΔBv increases, that is, as the luminance of the peripheral object increases to a greater extent than the luminance of the main object, back lighting becomes intensified, permitting an increased amount of light to impinge on the sensor 17a from the peripheral object, so that the value of correction α is increased. However, when β is smaller than 1/100, the ratio of size of the main object to the image area is very small, and the main object in the image area can not be regarded as such, so that no correction value α is used. Further if ΔBv is greater than 2.75, the amount of light impinging on the sensor 17a from the subobject can be regarded as small, that is, it can be considered that the main object luminance is measured relatively accurately despite intense back lighting and that the main object is relatively large. Accordingly, small amounts of correction α are used to utilize this photographying condition.

"Front lighting" and "back lighting" modes as classified according to the main object luminance Bvs and the subobject luminance Bva will now be described.

It is measured that the difference between these luminances, i.e. Bva−Bvs, is ΔBv'. When the difference between the subobject luminance and the main object luminance is greater than a definite value δ, that is ΔBv'>δ, this is to be interpreted as indicating that the subobject is exceedingly brighter than the main object, hence "back lighting". When ΔBv'≦δ, the luminance difference is to be interpreted as indicating a balance between the main object and the subobject in luminance, i.e., "front lighting".

Table 3 is a δ map giving definite values δ. The values δ were determined by actually taking photographs. Three different values δ are employed for different main object luminances since the amount of light impinging toward the center from the periphery increases as the luminance increases, presenting increased difficulty in detecting back lighting. The values listed in Table 3 are determined in corresponding relation to this.

TABLE 2

α Map

Unit: Ev

| β / ΔBv | 1/15 | 1/25 | 1/55 | 1/100 |
|---|---|---|---|---|
| 1.00 | 0.000 | 0.00 | 0.000 | 0.00 | 0.0 |
| 125 | 0.125 | 0.25 | 0.375 | 0.50 | 0.0 |
| 275 | 0.250 | 0.50 | 0.750 | 1.00 | 0.0 |
|  | 125 | 0.25 | 0.375 | 0.50 | 0.0 |

TABLE 3

δ Map

Unit: Ev

| Bvs | 6 | 9 |  |
|---|---|---|---|
| δ | 1.875 | 1.750 | 1.625 |

Next, the classification of modes wherein the flash is used will be described. The limit of luminance which requires a long exposure time and below which a camera shake is likely to occur (hereinafter referred to as "shake limit luminance") is assumed to be Bvh. When the overall luminance of the image area to be photographed is lower than the shake limit luminance Bvh, "flash mode" is used in which the flash is fired for photography.

Since the luminance Bvs of the main object differs from the luminance Bva of the subobject, the weighted average Bvs' of these luminances is to be used as an average luminance of the overall image area so as to consider the luminance. In the case of "front lighting", Evs' is given by: available $$Bvs' = Bvs/4 + (3 \cdot Bva)/4$$

When Bvs'≧Bvh, "front lighting flash mode"[is used. When Bvs'<Bvh, "dark flash mode" is used since the entire image area is dark.

In the case of "back lighting", the subobject luminance is greater than the main object luminance, so that the subject luminance Bva minus the foregoing value δ, i.e. Bva−δ, is to be used as data for determining whether "dark flash mode" is to be employed. More specifically, if Bva−δ≧Bvh, "back lighting flash mode" is used since the main object appears dark against a bright background owing to back lingting. When Bva−δ<Bvh, Bvs≦Bva−δ<Bvh, and the entire image area is dark despite back lighting, so that "dark flash mode" is used.

When the central luminance Bvl is as low as nearly the measurable limit of the sensor 17a, the measurement is of low reliability. Accordingly, regardless of front or back lighting, a weighted average Bvs' is then used which is obtained by weighting the subobject luminance Bva more than the main object luminance Bvs is used for processing in "low luminance processing mode". More specifically, "dark flash mode" is employed with Bvs' which is given by:

$$Bvs' = Bvs/8 + (7 \cdot Bva)/8$$

In "available light mode", "dark flash mode", "back lighting flash mode", and "forced flash mode", the exposure time of the pickup device 9 and the flash firing timing are controlled in the manner to be described below.

FIG. 3 shows the exposure time of the device 9 and the flash firing timing for illustrative purposes. With reference to the drawing, $th(=2^{-Tvh})$ represents the limit of exposure time beyond which a camera shake occurs (shake limit shutter speed). The value th varies with the output of the zoom encoder, i.e., with the focal length f of the lens. Indicated at $tm(=2^{-Tvx})$ is the highest shutter speed at which the exposure time of the device 9 is controllable, and at to is a time interval obtained by dividing tm by 2. $ta(=2^{-Tv})$ is a time lag until the flash is fired since the exposure of the device 9 is initiated by a shutter opening signal. In "flash mode", the device is exposed to available light until specified time ta, whereupon the flash is fired. Indicated at tf is the duration of flashlight, and at ts is the time when a proper amount of exposure is obtained.

(1) Available Light Mode

In "available light mode", one of the following three photographing methods is used according to the luminance of the main object.

1) In the case where the main object has very high luminance to achive a proper exposure within the time interval given by the highest shutter speed tm The device 9 is exposed to light until the time tm. The time interval, tm−ts, beyond time ts when the proper exposure is obtained results in overexposure, so that the photographed image signal has the gain reduced in the image processing circuit 25 to correct the exposure.

The overexposure time of tm/2 corresponds to an overexposure of 1 Ev, so that the system controller 10 feeds different amounts of gain correction to the image processing control circuit 25 for the different two cases of $ts \leq to$ (where $to = tm/2$), and $tm > ts > to$. More specifically, when $ts \leq to$, the excess of exposure time, $tm - ts$, is longer than $tm/2$. The gain is therefore decreased by 1.0 Ev. When $tm > ts > to$, the excess of exposure time, $tm - ts$, is shorter than $tm/2$, so that a gain of 0.5 Ev is decreased.

2) In the case where a proper exposure is obtained by a time interval shorter than the shake limit shutter speed th Photographs are taken properly only with usual available light. The image photographed is recorded with no correction made of the exposure by the image processing control circuit 25.

3) In the case where time ts giving a proper exposure exceeds the shake limit shutter speed th because of low main object luminance.

To avoid camera shake, exposure is forcibly discontinued at the limit shutter speed th, and the image photographed has its gain increased by 0.5 Ev by the circuit 25 to compensate for the insufficient exposure.

(2) Dark Flash Mode

In "dark flash mode", exposure is effected with available light until the exposure value for the main object reaches a level 1.0 Ev lower than the proper value (at time ta) since the exposure of the image pickup device 9 is started, whereupon the flash is fired. The exposure is discontinued when the exposure value for the main object has reached the proper value.

In "dark flash mode", different methods of photography are used depending on the luminance of the main object. Specifically, varying luminances of main objects involve the following three cases.

1) Proper exposure is obtained during the duration of flashlight.

2) Proper exposure is obtained after the duration of flashlight but within the shake limit time th.

3) The time ts at which proper exposure is obtained after the duration of flashlight is beyond the shake limit time th. (This case includes a case wherein the flash is fired at $ta = th$ and nevertheless fails to give proper exposure after the duration of flashlight tf.)

In the cases 1) and 2), the exposure is discontinued when the proper amount of exposure is obtained, and the photographed image is recorded with no exposure correction made by the image processing control circuit 25. In the case 3), the exposure is forcibly discontinued upon the lapse of shake limit time th to avoid the possible camera shake. The insufficient exposure is corrected by increasing the gain by 0.5 Ev by the image processing control circuit 25.

(3) Back Lighting Flash Mode

In "back lighting flash mode", the exposure of the pickup device 9 is effected with available light until the amount of exposure for the background subobject in the image area reaches a value 1 Ev higher than the proper value (at time ta), whereupon the flash is fired. The exposure is discontinued when a proper exposure amount is obtained for the main object.

In "back lighting flash mode", two methods of photography are used for the following respective cases, alternatively depending on the luminance of objects.

1) Proper exposure is obtained during the duration of flashlight.

2) Proper exposure is not obtained despite the lapse of duration of flashlight tf.

In the case 1), the exposure is discontinued when the proper amount of exposure is obtained, and the photographed image is recorded with no exposure correction made by the image processing control circuit 25. If the exposure is continued in the case 2) until time ts, beyond the flashlight duration tf, when the proper amount of exposure is obtained for the main object, excessive exposure is made for the subobject with available light after the emission of flashlight, since the background subobject is bright in "back lighting flash mode". Accordingly, the exposure is forcibly discontinued upon lapse of the time interval tf, and no exposure correction is made of the photographed image by the image processing control circuit 25.

Next, when the main object is at a distance beyond the reach of flashlight in "back lighting flash mode", exposure with available light is effected for an interval of time obtained by adding 1.0 Ev to the exposure value obtained by metering after the start of exposure of the device 9 (the time interval is assumed to be $ta' = ta/2$, ta is the flash firing time lag), whereupon the flash is a fired, and the exposure is discontinued on completion of emission of the flashlight. In the case where the time ts when the proper exposure is obtained for the main object is beyond the flashlight duration tf as in the case where the main object is not at the distance beyond the reach of flash light already stated, the exposure is forcibly discontinued upon the lapse of the flashlight duration tf, and the exposure is corrected by increasing the gain by 1.0 Ev by the image processing control circuit 25. Thus, in "back lighting flash mode" wherein the main object is at a distance beyond the reach of the flashlight, the auxiliary flashlight for the main object fails to act effectively, so that the exposure time with available light is shortened to one-half of the exposure time with available light already described for "back lighting flash mode" to give an overall exposure which is 1 Ev less. Subsequently, the flash is fired, and the exposure is forcibly discontinued upon completion of emission of light. The photographed image is then entirely corrected by increasing the gain by 1 Ev. Thus, to make the difference between the main object luminance and the subobject luminance smaller than the actual luminance difference, the photograph is taken of the overall object which is 1 Ev lower than a proper value in luminance, and the overall luminance is corrected to a 1 Ev higher value for the image obtained, whereby the main object can be photographed beautifully, with the main object and the subobject properly adjusted in luminance balance therebetween. The flash firing timing or time ta refers to the time interval from the start of exposure of the pickup device 9 until the start of firing of the flash and is calculated by the system controller 10 based on the luminance measurements of the main object and the subobject.

(4) Forced Flash Mode

Upon lapse of the time given by the highest shutter speed tm after the start of exposure in "forced flash mode", the flash is fired, and the exposure is discontinued when a proper amount of exposure is obtained for the main object. If the proper exposure time for the main object is in excess of the shake limit shutter speed th, the exposure is forcibly discontinued upon lapse of the shake limit time th to avoid the possible camera shake. The underexposure is corrected by increasing the gain of the image by 0.5 Ev by the image processing control circuit 25.

According to the present embodiment, the camera unit is subsequently controlled by the system controller 10 in the following manner.

Figure 4A:
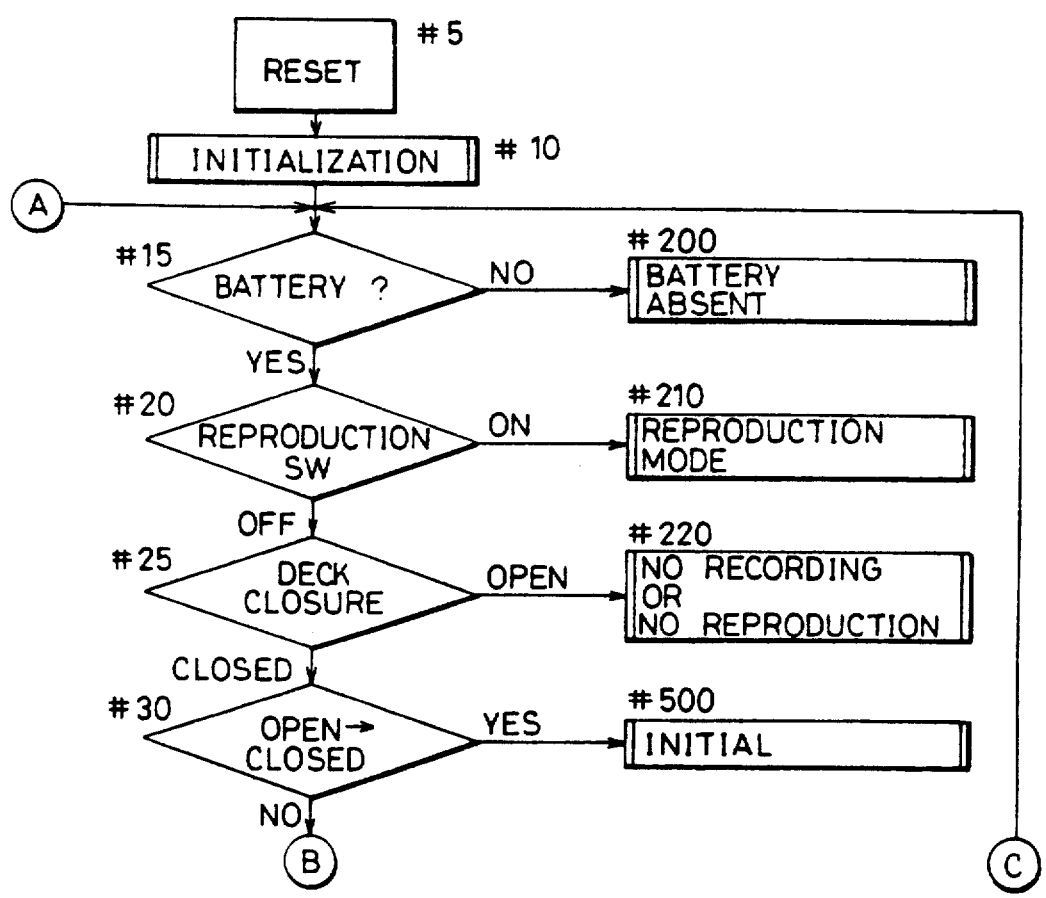
FIGS. 4A, 4B, 4C are flow charts combinedly showing the main program for controlling the camera unit of the electronic camera.
Figure 4B:
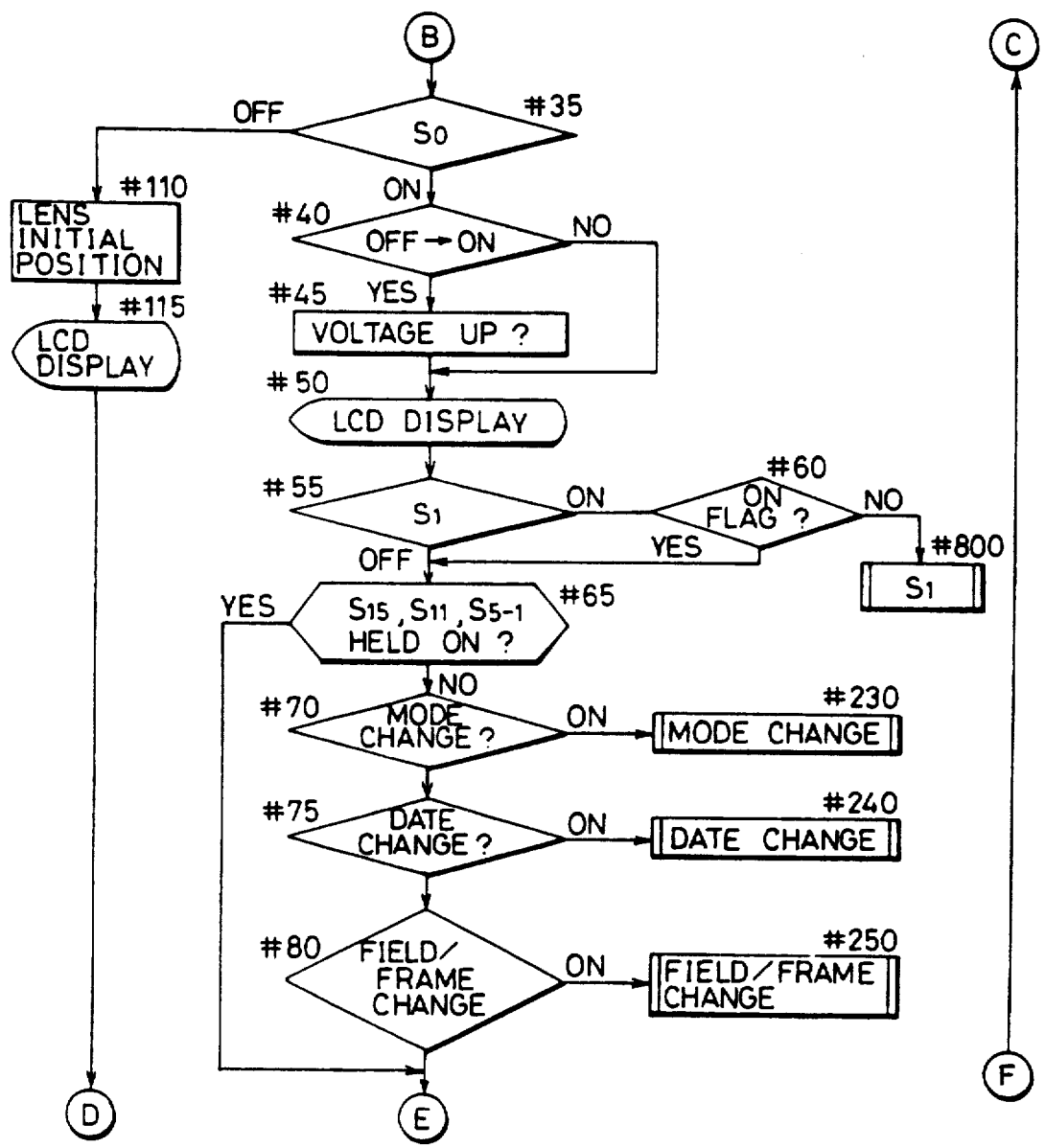
Figure 4C:
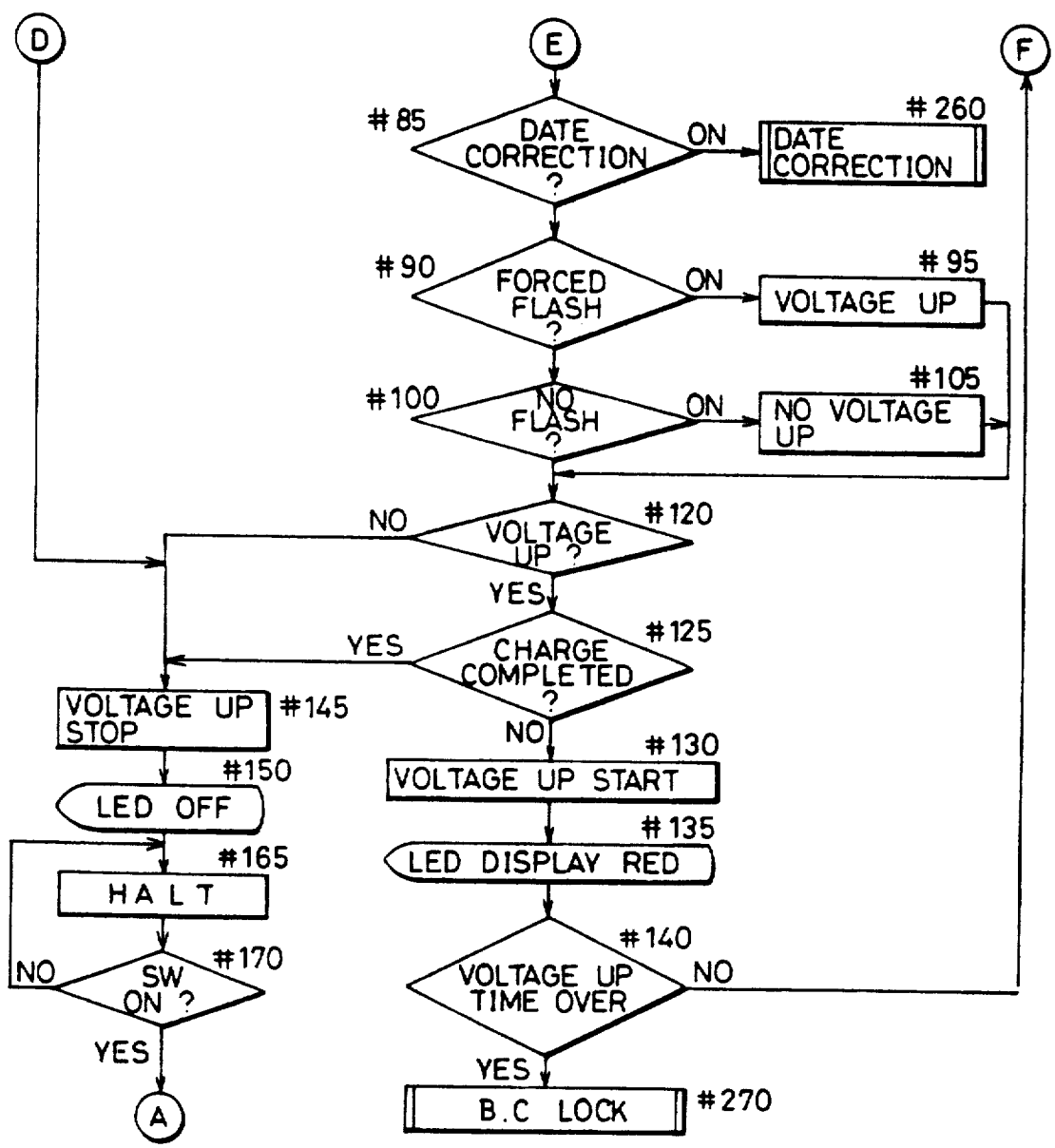

First, the main routine will be described with reference to the flow chart of FIGS. 4A, 4B, 4C. Initially, a battery is placed into the camera, and the system controller 10 is reset to the initial state (#5). An initialization subroutine is executed to initialize the system controller 10 (#10). Next in steps #15 to #30, the camera is checked as to whether it is in condition for photography. More specifically, inquiries are made as to whether the power supply buttery is in place (#15), whether "reproduction mode" is selected by the reproduction switch S10 (#20), whether the deck closure is open (#25) and whether the deck closure has changed from "open" to "closed" state (#30). If the camera is not loaded with the battery, "battery absent" subroutine is executed (#200). If "reproduction mode" is selected, "reproduction" subroutine is executed (#210). When the deck closure is open, "recording-reproduction prohibition" subroutine is performed to prohibit image recording and reproduction (#220). When an image recording floppy disk is placed in with the state of the deck closure changed from "open" to "closed", "initial load" subroutine is performed, information as to the floppy disk is recognized, and the information is loaded into the system controller 10 (#500).

Next, the main switch S0 is checked as to whether it is on (#35). If it is off, indicating that no photograph is to be taken, the sequence proceeds to #110 to set the objective lens 1 at the initial position, and the LCD display circuit 21a is turned off (#115). If the voltage for the flash circuit 18 is stepped up for charging the circuit, step #145 follows, in which the voltage increase is discontinued, and the LED display (red) within the viewfinder is turned off (#150). HALT state then follows (#160). In this state, the sequential operation of the system controller 10 is discontinued, and the switches 21 are checked at a specified time interval for changes in settings (#170). If there is no change, HALT state is continued. If otherwise, the sequence returns to #15.

When the main switch S0 is found to be on, an inquiry is made as to whether the main switch S0 has just changed from OFF to ON (#40). When the answer is in the affirmative, "voltage up" flag indicating a need for raising the voltage is set (#45). If the switch has not been turned on for the first time, step #45 is skipped, and the LCD display circuit 21a is turned on for display (#50). The LED display circuit 21a indicates the field or frame format selected, the single or self-timer mode selected, the count of photographs taken, battery alarm, recording mode, etc.

Next, the switch S1 for starting AE and AF is checked whether it is on (#55). If it is on, an inquiry is made as to whether "ON" flag indicating that the switch S1 is held depressed is set (#60), so as to effect AE and AF when the switch S1 is newly depressed but not to effect AE and AF if the switch is held depressed. Thus, when the flag is not set, "S1" subroutine is performed for AE (automatic exposure) and AF (automatic focussing) (#800). If the switch S1 is off or "ON" flag is set, inquiries are made about a change in the single/self-timer and field/frame modes and in date data (#65). If none of the single/self-timer mode change switch S15, field/frame mode change switch S11 and date data switch S5-1 are held depressed, these switch S15, S11, S5-1 are checked one after another for a change (#70 to #80). When the single/self-timer mode change switch S15 is found on in #70, "mode change" subroutine is executed in #230. If the date change switch S5-1 is found on in #75, "date change" subroutine is executed in #240. If the field/frame mode change switch S11 is found on in #80, "field/frame change" subroutine is executed in #250. When there is no change in the modes, the date is checked for a correction (#85). When all the switches are found to be held depressed, indicating no mode change, the sequence proceeds to the date correction step #85 without checking the ode change switches (skipping #70 to #80). If the date correction switch S15-2 is on, "date correction" subroutine is executed in #260. When no correction is made in the date data, an inquiry is then made about a need for the flash (#90 to #105). Depending on whether the flash is necessary, a corresponding flag is to be set to indicate whether a voltage increase is necessary to charge the flash circuit 18. If the "forced flash" switch S13 is found to be on in #90, "voltage up" flag is set (#95). When "no flash" switch S14 is found to be on in #100, "no voltage up" flag is set in #105.

Next, when "voltage up" flag is found to be set and if the circuit has not been completely charged, the voltage is increased, and the flash charging indicating LED display 19b (red) within the viewfinder is turned on (#120–#135). The voltage increasing time is checked (#140). If the voltage has been completely stepped up within a predetermined period of time, the sequence returns to #15. If otherwise, the battery is checked (#270). Further when "voltage up" flag is not found on in #120, or if the circuit is found charged up in #125, steps #145 to #170 are performed to bring about HALT state. On completion of the foregoing subroutines, the sequence returns to step #15 (A).

Figure 5:
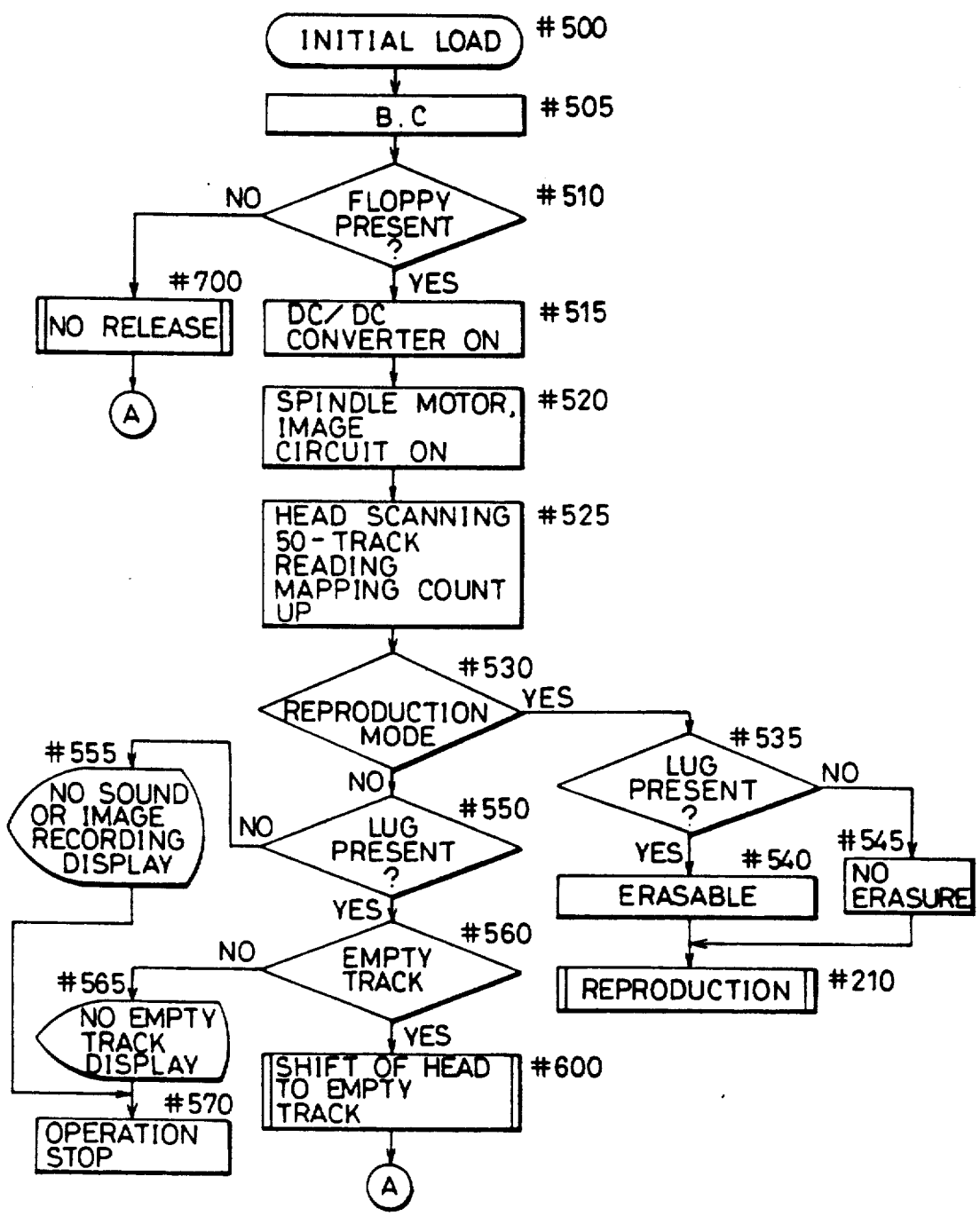
FIG. 5 is a flow chart for executing an initial load subroutine in the main program.

With reference to FIG. 5, step ·500, "initial load" subroutine will be described.

First, the battery is checked for its capacity (#505). Next, an inquiry is made as to whether a floppy disc cartridge is set in place (#510). If it is not placed in, "no release" subroutine is executed in #700 to prohibit the operation of the components other than the mirror 3 and the objective lens 1. When the answer is affirmative, the DC/DC converter 12 is started to supply power to the spindle motor 27 and the image processing control circuit 25 (#515).

Subsequently, the spindle motor 27 and the circuit 25 are energized (#520), and the data written on the floppy disk 26, i.e., 50-track data, is read to prepare a map. The track counted up is shown by the LCD display circuit 19b to indicate that the data on the floppy disk 26 has been recognized (#525).

Next, the reproduction switch S10 is checked as to whether "reproduction mode" has been selected (#530). If this mode has been selected, steps #535 to #545 follow to start "reproduction mode". More specifically, the floppy disk 26 is checked for the presence of the safety lug (#535). If the lug is absent, indicating that no recording is to be performed, "no erasure" flag is set (#540). If the lug is present, indicating that recording can be done, "erasable" flag is set (#545), followed by #210, "reproduction mode" subroutine. When "reproduction mode" is not found to be selected in #530, the floppy disk 26 is checked for the safety lug (#550). If the lug is absent, "no recording" is displayed on the LCD display circuit 19b for the disk 26 placed in (#555) to discontinue image recording operation (#570). If the lug is present, the floppy disk 26 is checked for empty tracks (#560). When no empty track is available, this is displayed on the LCD display circuit 19b (#565) to discontinue recording operation as in the absence of the lug (#570). When an empty track is available, the sequence proceeds to #600, in which the head is shifted to the unrecorded track with reference to the map data obtained in #525. The sequence then returns to the main routine, #15.

Figure 6A:
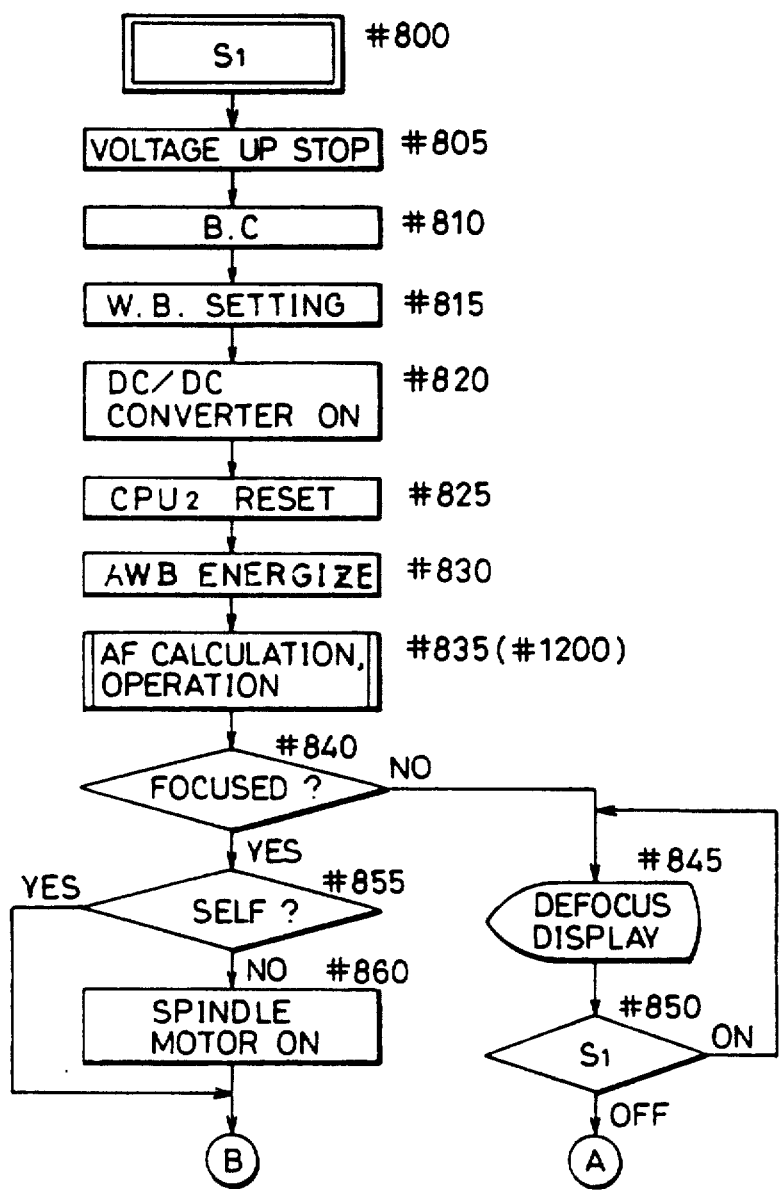
FIGS. 6A, 6B, 6C are flow charts combinedly showing the process to be executed when a switch S1 is turned on in the main program.
Figure 6B:
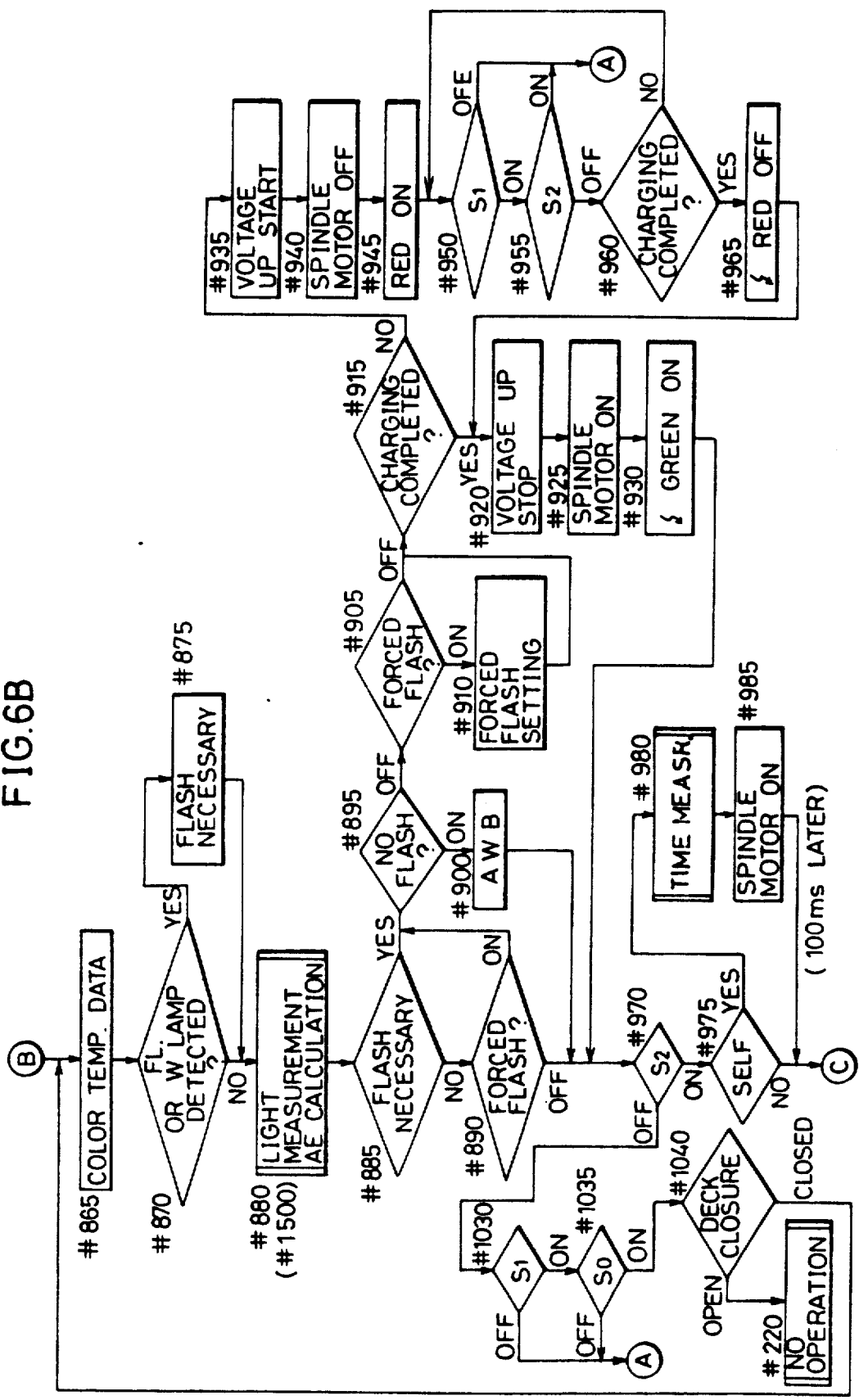
Figure 6C:
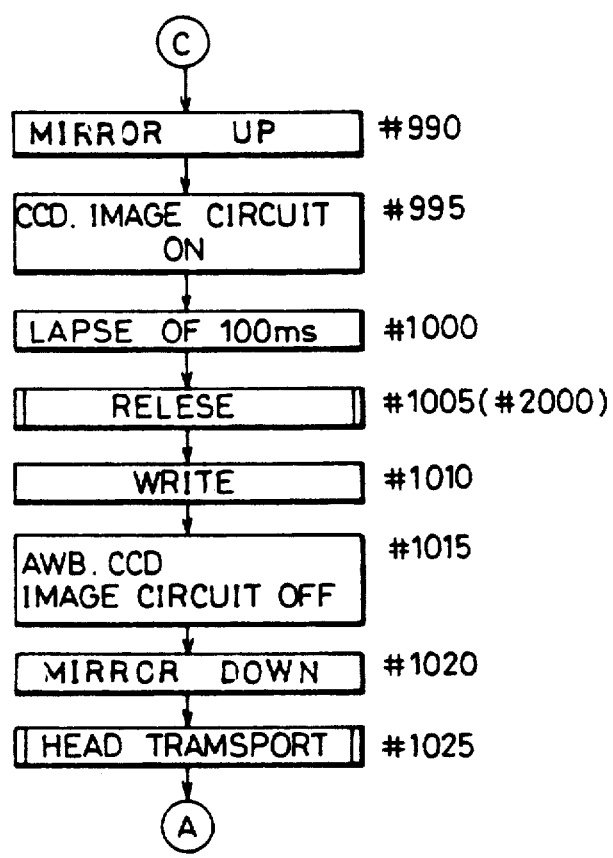

With reference to FIGS. 6A, 6B, 6C, step #800, "S1" subroutine will be described for effecting AE, AF, etc. In "S1" subroutine, AF is effected for the object, followed by AE. When the flash is needed, the flash is prepared for firing before the release action. Prior to AF, preparatory steps #805 to #835 are performed for battery check, power supply, system controller 23, white balance. More specifically, voltage increase, when done for the flash circuit 18, is discontinued (#805), the battery is checked (#810), the white balance (WB) is set to a specific color temperature for daylight (#815), and the DC/DC converter 12 is initiated into operation (#820) for supplying power to the image pickup device 9, the image processing control circuit 25, the spindle motor 27 and other circuits. The system controller 23 (CPU 2) is reset (#825), and the color temperature sensor circuit 20 is energized (#830).

Next, step #1200, AF subroutine (to be described later) is executed, and the objective lens is focussed on the object (#835). If the result of focus detection is low in reliability owing to a low contrast, hence incomplete focussing, defocus display is given within the viewfinder. The sequence then returns to the main routine, #15 (#840-#850). When focussing has been completed in #840, an inquiry is made as to whether the self-timer mode is selected (#855). If this mode is not selected, the spindle motor 27 is started to drive the floppy disk 26 for the preparation of image recording (#860). If the self-timer mode is selected, the spindle motor need not be driven before release, so that #860 is skipped. The data as to the color temperature of the light source is read form the color measurement data obtained by the color temperature sensor circuit 20 from the object (#865) to check whether the light source is a fluorescent lamp or tungsten lamp (#860). If the light source emits fluorescent light or tungsten light, "flash necessary" flag is set to use the flash for photography (#875) because flashlight is closer to the sunlight than the fluorescent or tungsten light which differs from the sunlight in color temperature distribution. The flashlight therefore produces more beautiful photographs. Thus, the flash is automatically fired. Unless the light source is a fluorescent lamp or tungsten light, step #1500, "light measurement" subroutine to be described is executed to measure the luminance of the object (#880) without setting the "flash necessary" flag.

On completion of measurement of the object luminance in #880, various flags are checked in #885 to #905 to determine whether the flash is needed. First, "flash necessary" flag is checked as to whether it is set (#885). If the flag is set, or "forced flash mode" has been selected although the flag is not set (#890), an inquiry is then made as to whether "no flash mode" is selected (#895). When the answer is in the negative, indicating that the current mode is the flash mode, an inquiry is made as to whether "forced flash mode" is selected (#905). If the answer is in the affirmative, "forced flash mode" flag is set (#910), and the flash circuit 18 is checked for the charged state (#915). The "forced flash mode" flag is set in #910 because "forced flash mode" and the auto mode differ in flash firing timing and need to be distinguished from each other.

When the flash circuit 18 has been found charged up in #915, voltage increase for charging is discontinued (#920). If the spindle motor 27 has not been started in #860, the motor 27 is energized to prepare the floppy disk 26 for image recording (#926). Completion of charging for the flash is indicated by the LED display 19a (green) within the viewfinder (#930), followed by #970 to check the release switch S2. If the flash circuit 18 has not been found charged up in #915, voltage is stepped up for charging (#935). When the spindle motor 27 has been started in #860, the motor is deenergized (#940), and the LED display 19a (red) indicates in the view finder that the flash circuit is being charged (#945). The spindle motor 27 is deenergized in #940 to avoid waste of current since the motor need not be driven while the flash is being prepared for firing.

Next, the switch S1 is checked (#950). If it is off, the sequence returns to the main routine, #15. When it is on, the switch S2 is checked (#955). When this switch is on, the main routine, #15 follows. If it is off, the flash circuit 18 is checked as to whether it has been charged up (#960). If the circuit has not been charged up, #950 follows again to check the switches S1, S2. When the circuit has been charged up, the LED display 19a (red) representing the charging operation within the view finder is turned off (#965). The sequence then proceeds to the foregoing steps #920 to #930.

If "forced flash mode" is not found to be selected in #890, #970 directly follows since the flash is not to be fired, to check the release switch S2. Further also when "no flash mode" is found to be selected in #895, the flash is not to be fired, so that firing of the flash is prohibited in preference to "forced flash" and the auto mode. The daylight color temperature instruction set by #815 is converted to a color balance adjusting signal for the image to be photographed, by the color temperature sensor circuit 20 based on the color measurement data given in #865, and the signal is output (#900), followed by #970.

The release switch S2 is then checked (#970). If the switch S2 is off, the switches S0, S1 are checked (#1030-#1035). When one of the switches is off, the sequence returns to the main routine, #15. If both the switches S0, S1 are on, the deck closure is checked for position (#1040). When the closure is closed, #865 follows, whereas if it is open, the subroutine of #220 is executed to prohibit any operation for image recording and reproduction.

If the release switch S2 is found to be on in #970, an inquiry is made as to whether the self-timer mode is selected (#975). If this mode is selected, time is measured for starting a self-timer photographic operation, flickering the LED 14 (#980) and starting the spindle motor 27 to prepare the floppy disk 26 for image recording (#985). Upon lapse of 100 ms, the main mirror 3 is swung up, permitting light to impinge on the image pickup device 9 (#990). Unless the self-timer mode is selected, #980 to #985 are skipped, the main mirror 3 is swung up and the device 9 and the image processing control circuit 25 are initiated into operation (#995).

After counting up the power supply rise time (about 100 ms) for the circuit 25 (#1000, #2000), "release" subroutine to be described later is executed for the exposure of the device (#1005). On completion of the exposure, the photographed image is recorded on the floppy disk 26 (#1010), and the color temperature circuit 20, image circuit 25 and pickup device 9 are brought out of operation (#1015). The main mirror 3 is lowered (#1020), "head transport" subroutine (for example, specifying the next track with reference to the map data) is executed (#1025), whereupon the sequence returns to the main routine, #15.

According to the embodiment described, AF is executed first to accurately focus the lens on the object, and light measurement (AE) calculation is then performed so that the luminance of the main object and that of the subobject can be accurately measured in "S1" subroutine. This makes it possible to suitably classify the light measuring modes and accurately calculate flash firing timing based on the accurate light measurement data in the "light measuring" subroutine to be described below. Further in self-timer mode, the spindle motor 27 is not started unless the specified time elapses to avoid useless current consumption. In the case where the light source is a fluorescent lamp or tungsten lamp, the color temperature is set to the sunlight (flashlight), and the flash is fired automatically for photography. When "no flash mode" is selected by the no flash switch S14, the color temperature is automatically adjusted to that of the fluorescent lamp or tungsten lamp (AMB).

Figure 7:
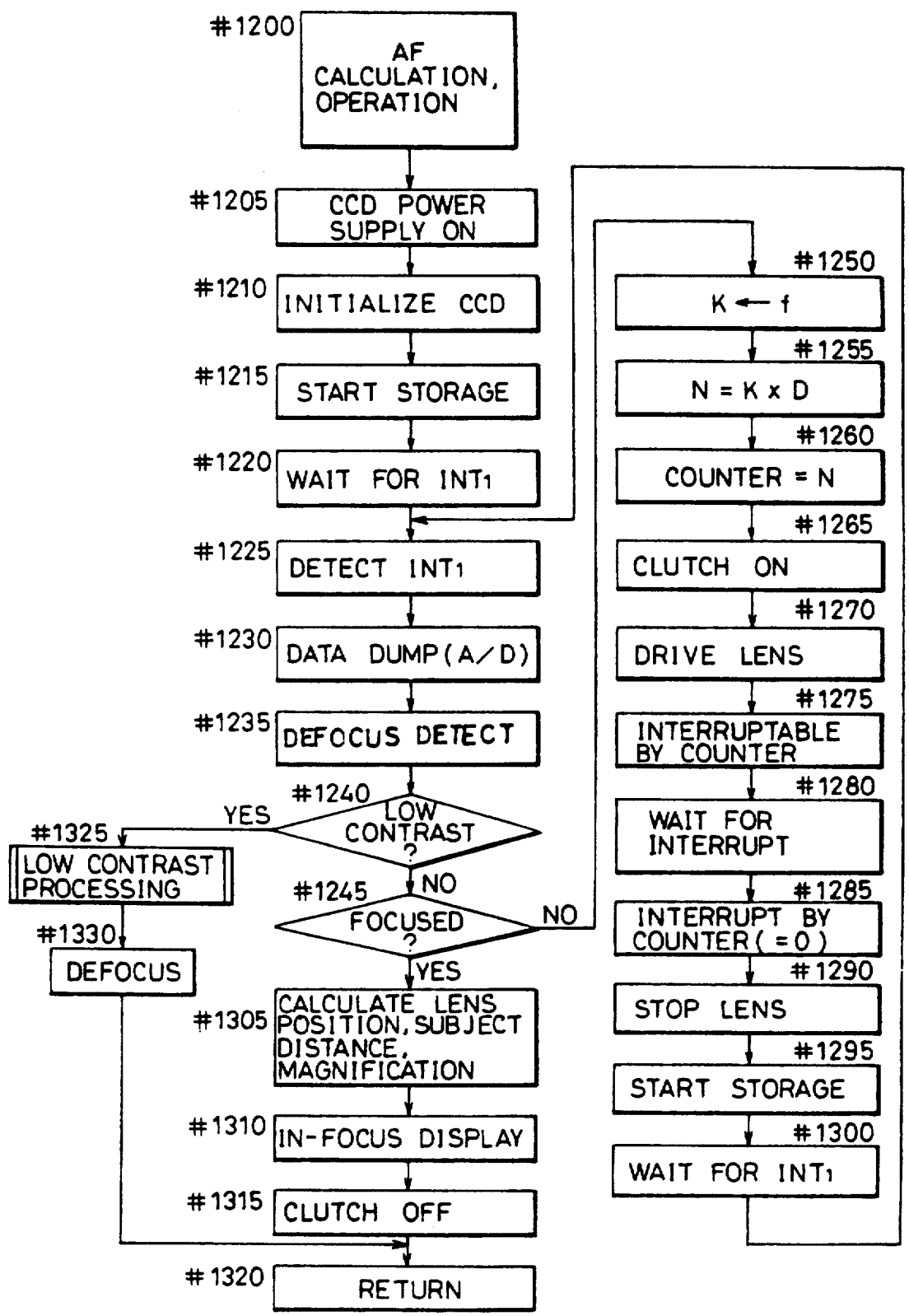
FIG. 7 is a flow chart showing the process to be executed for AF in the flow chart of FIG. 6.

Next, the "AF" subroutine of #1200 (above-mentioned #835) for AF will be described with reference to FIG. 7.

First, the power supply for the focus sensor 7 (CCD line sensor) is turned on (#1205). Next, the undesired charge stored in the sensor is discharged to bring the sensor into the initial state (#1210) to start storing charges in the focus sensor (#1215). The system thereafter waits until an interrupt signal INT1 is given, notifying the completion of charge storage in the focus sensor (#1220). When the interrupt signal INT1 is detected (#1225), the stored charges are transferred from the focus sensor 7 to an analog shift register, which in turn delivers the charges form pixel to pixel to the system controller 10 on A/D conversion (#1230).

Subsequently, the defocus amount D is detected from the data delivered to the system controller 10 (#1235) and is checked for reliability (#1240). If the reliability is low because of low contrast, "low contrast" subroutine is executed (#1325), and a defocus display is given (#1330). The sequence then returns to the main routine (#1320). If the defocus amount is found reliable, an inquiry is made as to whether the lens is accurately focused (#1245). When the lens is accurately focused, data as to the position where the lens 1 is currently at a stop is determined form the data as to the previous stopped position of the lens and the data as to the amount of movement thereof currently made. The object distance is determined from the resulting data using a conversion coefficient according to the focal length f involved to calculate the magnification β from the object distance and the focal length f (#1305). The LED display 19a gives an in-focus display (green) within the view finder (#1310), the clutch circuit 13 is disengaged, and the motor M is decoupled from the objective lens 1 and coupled to the main mirror 3 (#1315). The sequence then returns to the main routine (#1320). If the lens is found out of focus in #1245, the lens is focused by the following procedure.

First, based on the current focal length f from the zoom encoder switch S12, a coefficient K for the conversion of amount of forward shift of the lens is read from the ROM in the system controller 10 (#1250). The defocus amount D is multiplied by the conversion coefficient K to calculate the pulse number N ($=K \times D$) for the photo-interrupt circuit 22e corresponding to the amount of rotation of the motor required for focusing (#1255). The pulse number N is then fed to a "counter" within the system controller for monitoring the amount of rotation of the motor (#1260). The clutch circuit 13 is engaged to decouple the motor from the main mirror 3 and couple the motor to the lens 1 (#1265), starting to drive the lens 1 (#1270).

The rotation of the motor is then made interruptable by the "counter" (#1275). The motor is held in rotation until it is interrupted by the counter with the counter value reduced to zero (#1280). Upon interruption by the counter (#1285), the lens 1 is halted at the focused position (#1290). To confirm the focused state, storage of charges in the focus sensor 7 is commenced again (#1295), and the system is allowed to wait until an interrupt signal INT1 is given (#1300), followed by #1225 again for the recognition of focusing. If the lens is still found incompletely focused, the sequence proceeds form #1245 to #1250 to repeat the routine of #1250–#1300 until the lens is completely focused.

Figure 8A:
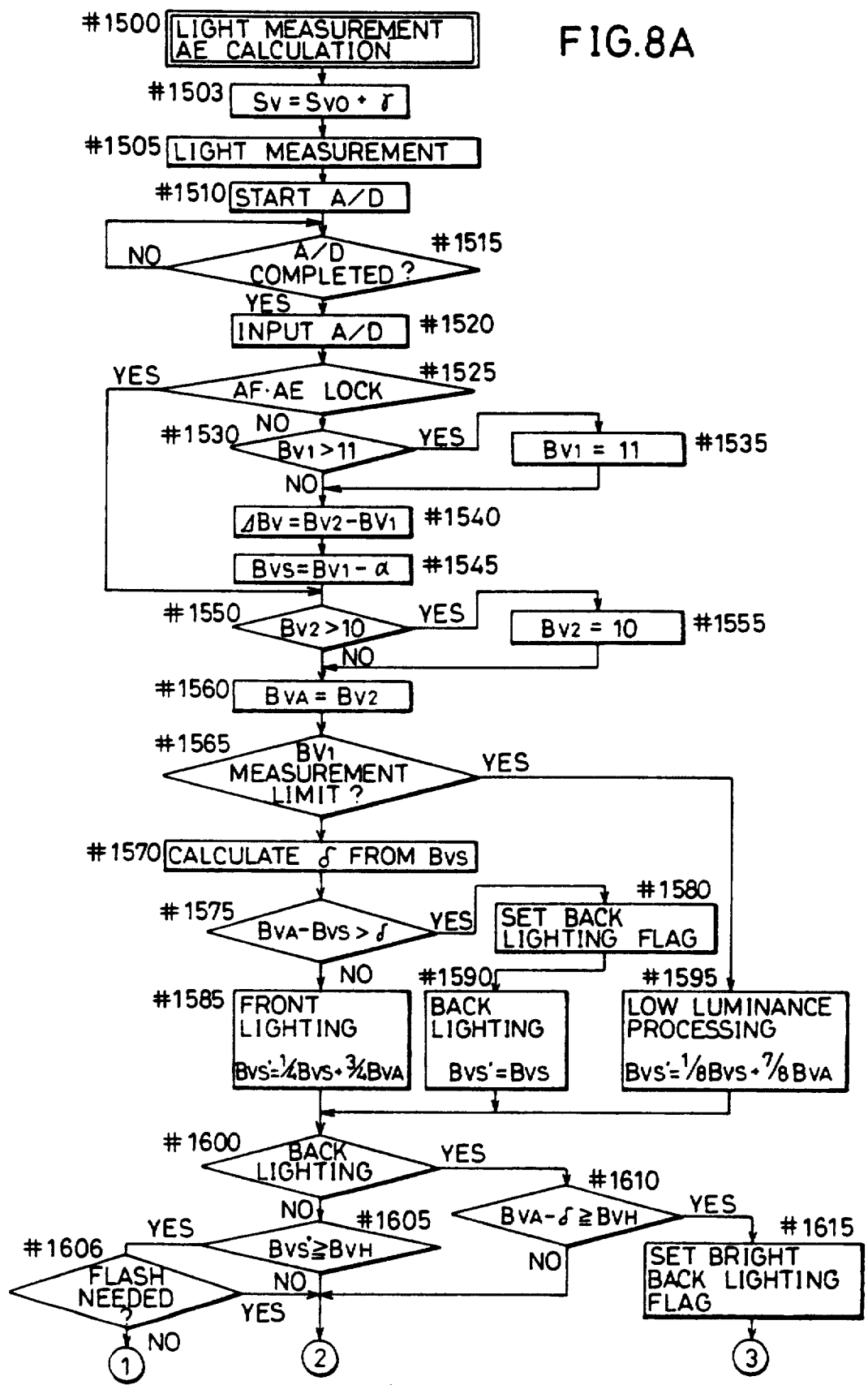
FIGS. 8A, 8B, 8C are flow charts combinedly showing the process to be executed for performing light measurement AE calculation in the flow chart of FIG. 6.

Step #1500 (#880), "light measuring" subroutine will be described with reference to FIG. 8A, in which calculations are conducted in apex values.

First, a calculation for correcting the ISO sensitivity is performed, that is, corrected ISO sensitivity $Sv(=Svo+\gamma)$ is calculated from the reference ISO sensitivity Svo of the solid-state image pickup device 9 and a value $\gamma$ for correcting the variation of the image pickup sensitivity thereof (#1503). Next, the central luminance Bv1 (spot value) of the image area to be photographed and the peripheral luminance Bv2 (average value) thereof are measured by the light measuring sensors 17a, 17b, respectively (#1505). The measurement analog signals obtained by the sensors 17a, 17b, are then converted to digital signals by the double integration circuit 22g (#1510). Subsequently, an inquiry is made as to whether the A/D conversion has been completed (#1515). If the answer is in the negative, the system waits until completion, whereupon the converted measurements in the form of digital signals are fed to the system controller 10 (#1520).

Next, an inquiry is made about whether AF/AE lock has been completed (#1525). If the answer is negative, steps #1530 to #1545 are executed to obtain the difference ΔBv between the peripheral luminance Bv2 and the central luminance Bv1, and the main object luminance Bvs. More specifically, Bv1 is checked as to whether it is greater than 11 (#1530). If the value is greater than 11, the central luminance is excessively high, so that Bv1 is fixed to 11 (#1535). The Bv1 value, when up to 11, is used as it is to calculate the luminance difference ΔBv≦Bv2−Bv1 (#1540). Next, the main object luminance Bvs is calculated by subtracting the correction value α given in Table 1 from the central luminance Bv1 (i.e., Bv1=α) (#1545). When AF/AE is locked, the luminance difference ΔBv and main object luminance Bvs are already obtained, so that the step #1550 to be described below follows, with #1530 to #1545 skipped.

When the sequence proceeds to the light measurement (AE) calculation subroutine for the first time (in "S1" subroutine, #880, the sequence proceeds to #1500) after the switch S1 is closed in the main routine, AF/AE is not locked, and #1525 is directly followed by #1530. When the sequence returns from #1040 to #865 in "S1" subroutine and proceeds from #880 to #1525 again, AF/AE is locked for the first time.

Next, an inquiry is made about whether the peripheral luminance Bv2 is greater than 10 (#1550). The peripheral luminance Bv2, when above 10, is too high and is therefore fixed to 10 (#1525). The Bv2 value, if up to 10, is taken as it is as the subobject luminance Bva (#1560). An inquiry is then made about whether the central luminance Bv1 is as low as around the measurement limit value of the sensor 17a (#1565). When the luminance Bv1 is low and close to the limit value, the average luminance Bvs' of the entire image area to be photographed is calculated form the following equation for low luminance processing (#1595), followed by #1600.

$$Bvs' = \frac{Bvs}{8} + \frac{7 \cdot Bva}{8}$$

Unless the luminance Bv1 is low, the reference value δ for judging back lighting is determined from Table 2 and Bvs (#1570). The reference value δ obtained in #1570 is then compared with the difference between the subobject luminance Bva and the main object luminance Bvs, i.e., ΔBv'(=Bva−Bvs) (#1575). If ΔBv'>δ, this is interpreted as indicating back lighting, and "back lighting" flag is set (#1580). For back lighting processing, Bvs is taken as the average luminance Bvs' (#1590), followed by #1600. If ΔBv'≦δ, this is interpreted as indicating "front lighting, " and the average luminance Bvs' is calculated from the following equation for front lighting processing (#1585), followed by #1600.

$$Bvs' = \frac{Bvs}{4} + \frac{3 \cdot Bva}{4}$$

Next, the photographic mode is determined in #1600 to #1615. First, an inquiry is made about whether "back lighting" flag is set (#1600). When the flag is not set ("front lighting mode"), the average luminance Bvs' of the entire image area determined in #1585 or #1595 is compared with the camera shake limit luminance Bvh to select the mode to be adopted from among "flash modes" and "available light mode" (#1605). If Bvs'≧Bvh, an inquiry is made as to whether the flash necessary flag is set (#1606). The flag, when set, indicates that the illumination light source is not sunlight but artificial light such as fluorescent light or tungsten light. It is noted that the flag has been set in #875 of FIG. 6. The sequence proceeds to routine (2) of "dark flash mode". On the other hand, if the flag is not set, the sequence proceeds to "available light mode", routine (1), #1620. If Bvs'<Bvh, "dark flash mode", routine (2), #1675 follows. When "back lighting" flag is set ("back lighting mode"), the luminance obtained by subtracting the reference value δ from the subobject luminance Bva, i.e., Bva−δ, is compared with the shake limit luminance Bvh (#1610). When (Bva−δ)≧Bvh, "bright back lighting" flag is set which represents back lighting with a bright background (#1615), and the sequence proceeds to "back lighting flash mode", routine (3), #1800. If (Bva−δ) <Bvh, this indicates back lighting with a dark background, so that the sequence proceeds to "dark flash mode", routine (2), #1675.

"Available light mode" will be described.

First, an inquiry is made about whether "forced flash" flag is set (#1620). When the flag is not set, an inquiry is then made whether "bright back lighting" flag is set (#1625). If this flag is not set either, the average luminance Bvs' is used as a control Bv value, Bvt (#1630), and the correction value ΔEvhsl for directly measuring the main object luminance is set to 0 (#1635). When "bright back lighting" flag is set in #1625, representing back lighting with a bright background, the control Bv value Bvt is set to the main object luminance Bvs as corrected by +0.5, i.e., Bvs+0.5 (#1640), and the correction value ΔEvhl to (0.5−α) (#1645). The correction value α is given in Table 2 and varies with the magnification β.

Next, the control Bv value Bvt is compared with the lowest luminance Bv at which photographs can be taken (#1650). If Bvt≦Bvl, the image to be photographed is too dark, so that "no photo" flag is set (#1660), "no photo" display is given inside the viewfinder (#1665), and "release lock" subroutine is executed so as not to take any photograph (#1670). When Bvt>Bvl, "flash unnecessary" flag is set (#1655), whereupon the sequence returns to the main routine (#1795). When "forced flash" flag is found to be set in #1620, representing the flash mode, "dark flash mode", routine (2), #1675 follows.

Next, "dark flash mode", routine (2) will be described.

First, an inquiry is made as to whether "no flash" flag is set (#1675). If the flag is set, this indicates "available light mode". The sequence proceeds to routine (1), #1625 of this mode. If the flag is not set, the main object luminance Bvs as corrected by +1.0, i.e., Bvs +1, is compared with the shake limit luminance Bvh (#1680) to change the setting of control Bv value according to the luminance of the main object. More specifically, when Bvs+1≧Bvh, the control Bv value Bvt is set to the main object luminance Bvs as corrected by +1.0, i.e., to the luminance (Bvs+1) (#1685). If Bvs+1<Bvh, indicating that the main object luminance is lower than the shake limit luminance, the control Bv value Bvt is fixed to the shake limit luminance Bvh (#1690).

Next, with 0 used as the coefficient K to be added to the correction value ΔEvfl for the flashlight exposure (#1695), flashlight exposure correction values ΔEvfl are determined for three magnification values β (#1700) in steps #1705 to #1715. If β>(1/25), the correction value ΔEvfl is set to 0 (#1705). When (1/25)≧β>(1/55), the value ΔEvfl is set to (0.5−K) (#1710). If (1/55)≧β, the value ΔEvfl is set to (1.0−K) (#1715). Thus, the amount of flashlight exposure is corrected because the size of the main object in the image area to be photographed varies with the magnification β, hence the need to alter the amount of exposure.

Subsequently, the correction value ΔEvfl is added to the maximum amount of flashlight Iv to obtain an amount of flashlight Iv'(=Iv+ΔEvfl). Further the aperture value Avd is calculated from the following equation (#1720).

$$Avd = Iv' + Sv - Dv$$
$$= Iv + Sv - Dv + \Delta Evfl$$

where Sv is the sensitivity of film, and Dv is the object distance data.

Next, the aperture value Avd obtained by #1720 is compared with the aperture value Avoz in conformity with the current focal length to check whetehr the object distance is beyond the reach of the flashlight (#1725). When Avd>Avoz, "beyond limit" alarm is given to indicate that the object distance is beyond the reach of the flashlight (#1730). Furthermore, "beyond limit" flag is set (#1735), and the aperture value Avd is set to Avoz (#1740). When Avd≦Avoz, #1725 is immediately followed by step #1740 wherein the aperture value Avd is set to Avoz.

The luminance Bvm (=Tvm+Avd-Sv) calculated from the aperture value Avd obtained by #1740, the highest shutter speed Tvm and the film sensitivity Sv is then compared with the control Bv value Bvt set by #1685 or #1690 (#1745). If Bvt≦Bvm, the sequence proceeds directly to #1765 to calculate the flash firing timing or time Tv using the control Bv value Bvt. If Bvt>Bvm, an inquiry is made as to whether "bright back lighting" flag is set (#1750). Unless the flag is set, #1765 follows. If the flag is set, the control Bv value Bvt is set to (Tvm+Avd-Sv) (#1755), and the main object luminance Bvs is compared with the control Bv value Bvt (=Tvm+Avd -Sv) obtained by #1755 (#1760). When Bvs≦Bvt, the sequence proceeds to #1765 to calculate flash firing time Tv using the control Bv value Bvt set in #1755. Further if Bvs>Bvt, "available light mode", routine (1), #1620 follows. In #1765, the flash firing time Tv is given by:

$$Ev = Bvt + Sv$$
$$Tv = Ev - Avd$$
$$= Bvt + Sv - Avd$$

The flash firing time Tv calculated in #1765 is then compared with the highest shutter speed Tvm or the shake limit shutter speed Tvh (#1770, #1780). If Tv≧Tvm, the flash firing is not controllable, so that the time Tv is set to the highest shutter speed Tvm (#1775). If Tv≦Tvh, a camera shake is likely to occur before firing the flash, so that the time Tv is set to the shake limit shutter speed Tvh (#1785). "Flash necessary" flag is set (#1790), whereupon the sequence returns to the main routine (#1795). When Tvh<Tv<Tvm (#1770, #1780), the sequence proceeds to #1790 and #1795 with Tv obtained in #1765.

"Back lighting flash mode", routine (3) will now be described.

First, an inquiry is made about whether "no flash" flag is set (#1800). If the flag is set, the sequence proceeds to "available light mode", routine (1), #1625. Unless "no flash" is set, the control Bv value Bvt is set to a value obtained by subtracting a collection value of 1.0 Ev from the subobject luminance Bva, i.e., Bvt=Bva−1.0 (#1805). The difference between the control Bv value Bvt and the main object luminance Bvs, namely the luminance difference ΔEvn (Bvs−Bvt) of available light component from the proper luminance, is calculated (#1810). The luminance difference ΔEvn is then compared with −1.0 Ev (#1815). If Evn>−1.0, ΔEvn is fixed to −1.0, and the control Bv value Bvt is set to the main object luminance Bvs plus the correction value 1.0 Ev, hence Bvt=Bvs+1.0. When ΔEvn≦−1.0, Bvt=Bvs+1.0 and ΔEvn=Bvs−Bvt set in #1805 and #1810, respectively, are used. The coefficient K to be added to the flashlight exposure correction value ΔEvfl is to set the value α (#1825), whereupon the sequence proceeds to the steps #1700 et seq. already described for "dark flash mode".

In "back lighting flash mode", specified flash firing time (timing) Tv is calculated form the subobject luminance (or from the main object luminance if δ≦Bv≦2), the flash is fired the specified time Tv after the start of exposure, and the exposure is discontinued when proper exposure has been made for the main object to adjust the luminance balance between the main object and the background subobject. With the present embodiment, the exposure is stopped when the proper main object exposure amount has been obtained with use of flashlight, whereas an excessive subobject exposure amount results in corresponding relation to the duration of the flashlight. Accordingly, a second embodiment will be described below which is adapted to accurately adjust the luminance balance between the main object and the subobject by calculating a period of correction time x (second) from the luminance difference between the main object and the subobject and firing the flash x (second) before the lapse of the specified time.

Suppose the specified time Tv as calculated in second is x″, and the flash firing time obtained by correcting x″ by the time period x is x′ (second).

$$x'' = 2^{-Tv} \text{ (second)}$$

$$x' = x'' - x \text{(second)}$$

The flash firing time x' is therefore expressed by $$x' = 2^{-Tb} - x \text{ (second)}$$

Figure 8B:
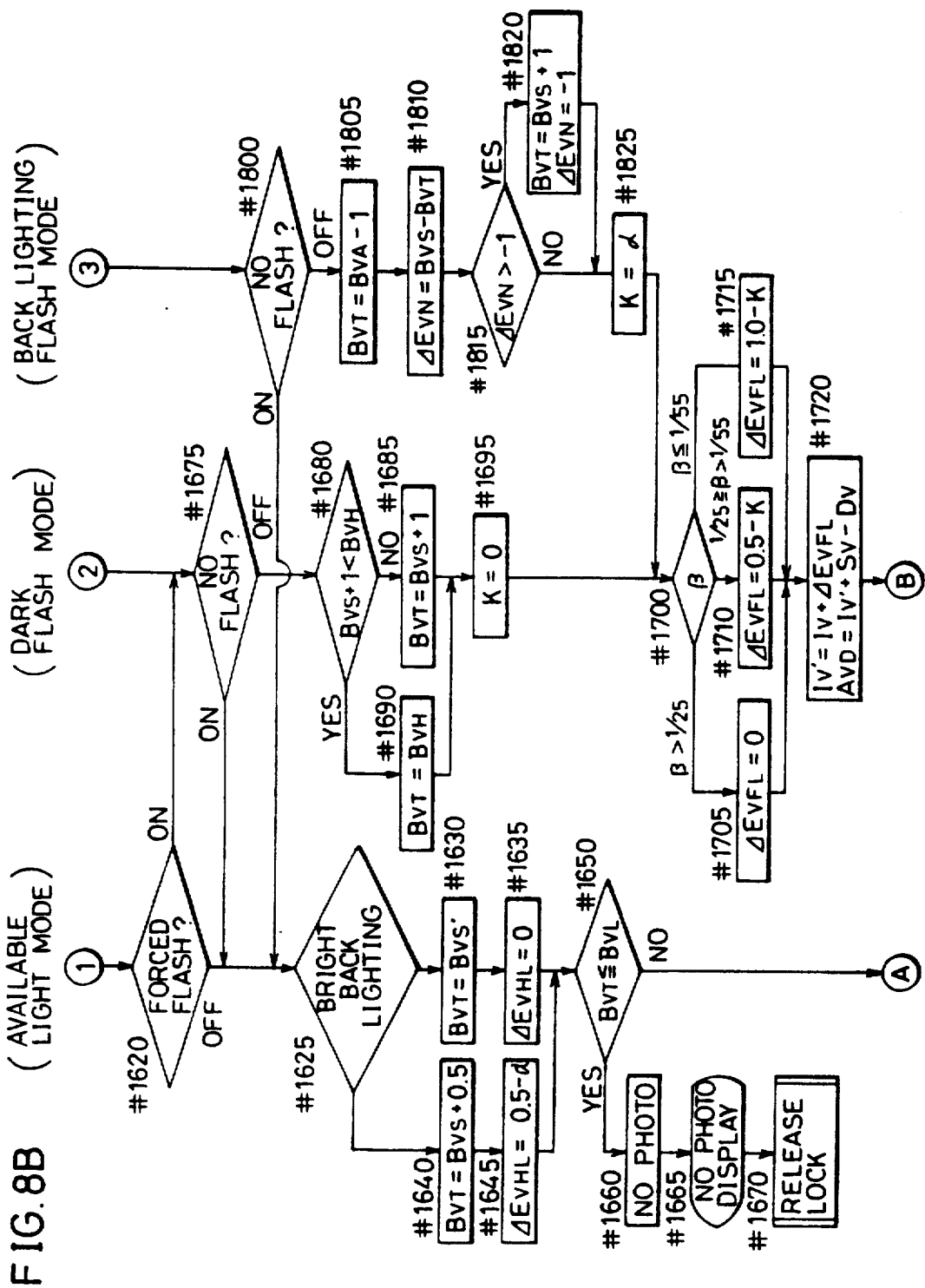
Figure 8C:
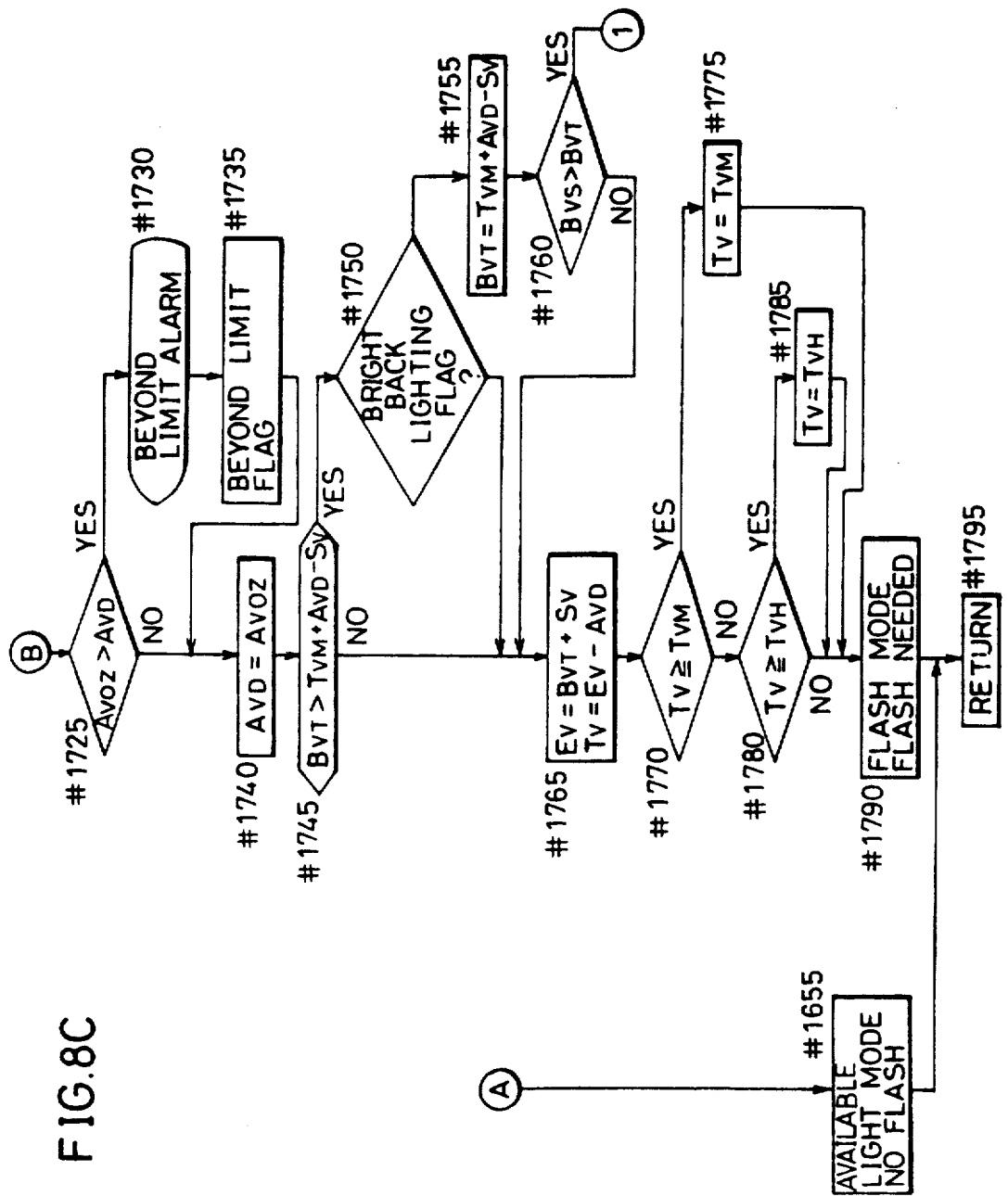
Figure 8D:
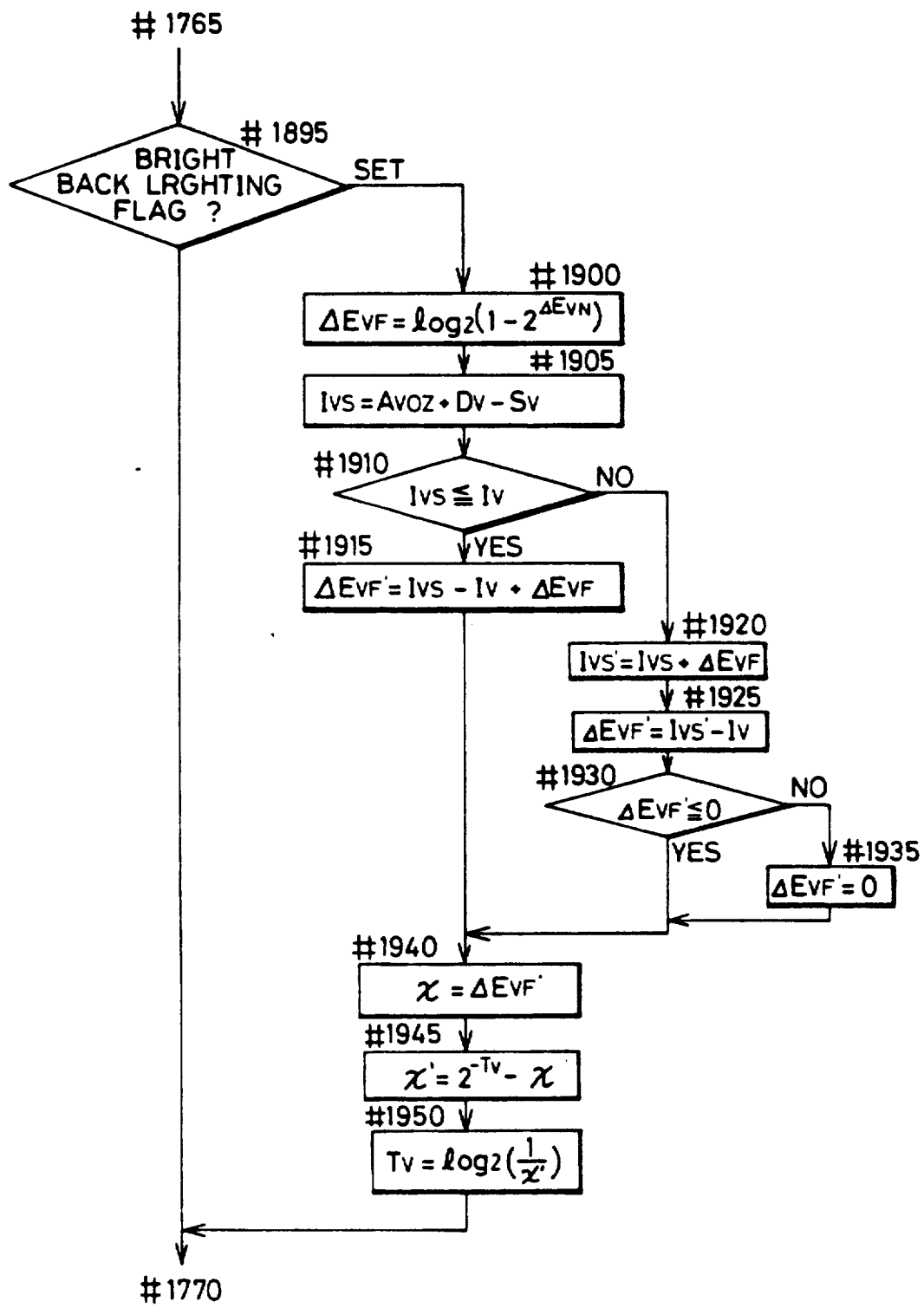
FIG. 8D is a flow chart for illustrating the flash firing timing according to a second embodiment of the invention.

With reference to the flow chart of FIG. 8B, the second embodiment will be described wherein the specified flash firing time x' is used in "back lighting flash mode". The flow chart of FIG. 8B is to be positioned between #1765 and #1770 in FIG. 8A.

After the calculation of flash firing time Tv in #1765, an inquiry is made as to whether "bright back lighting" flag is set (#1895). Unless the flag is set, #1770 directly follows. When the flag is set, the correction value ΔEvf by which the flashlight is to be corrected to give a proper amount of flash light is calculated from the following equation (#1900).

$$\Delta Evf = log_2(1 - 2^{\Delta Evn})$$

where ΔEvn is the luminance difference of available light from the proper luminance thereof.

Next, the amount of flashlight, Ivs, needed in view of main object distance is calculated form the following equation (#1905).

$$Ivs = Avoz + Dv - Sv$$

The flashlight amount Ivs obtained by #1905 is then compared with the actual amount of flashlight to be emitted (#1910). If Ivs≦Iv, a correction value ΔEvf′ is calculated from the following equation using the flashlight amount Ivs related to the main objected distance and flashlight correction value ΔEvf (#1915).

$$\Delta Evf = Ivs - Iv + \Delta Evf$$

The correction time x corresponding to the correction value ΔEvf' is determined from Table 4 (#1940). Further if Ivs>Iv, the luminance difference correction value ΔEvf is added to the flashlight amount Ivs to calculate a corrected amount of flashlight Ivs' (=Ivs+-ΔEvf) (#1920). The correction value ΔEvf' is calculated from the difference between the amount Ivs' and the actual amount of flashlight Iv (#1925). That is, $$\Delta Evf' = Ivs' - Iv$$

Next, an inquiry is made as to whether the correction value ΔEvf' is up to 0 Ev (#1930). When ΔEvf' >0, ΔEvf' is set to 0 (#1935). If ΔEvf'≦0, the sequence proceeds directly to #1940, in which correction time x corresponding to the value ΔEvf' as it is determined from Table 4.

Using the value x obtained by #1940 and the specified time Tv, the flash firing time x' (second) is then calculated from the following equation (#1945).

$$x' = 2^{-T_v} - x$$

Next, the flash firing time x' (second) is converted to Tv (Ev) using the following equation, whereupon the sequence proceeds to #1770.

$$Tv = \log_2(1/x')$$

TABLE 4

| ΔEvf' [Ev] | −0.25 | −0.50 | −0.75 | −1.0 | −1.50 | −2.00 | −3.00 | −4.00 |
|---|---|---|---|---|---|---|---|---|
| [sec] | tf | 0.29 tf | 0.21 tf | 0.16 tf | 0.12 tf | 0.09 tf | 0.06 tf | 0.03 tf | 0.0 |

Note tf duration of flashlight

Figure 9A:
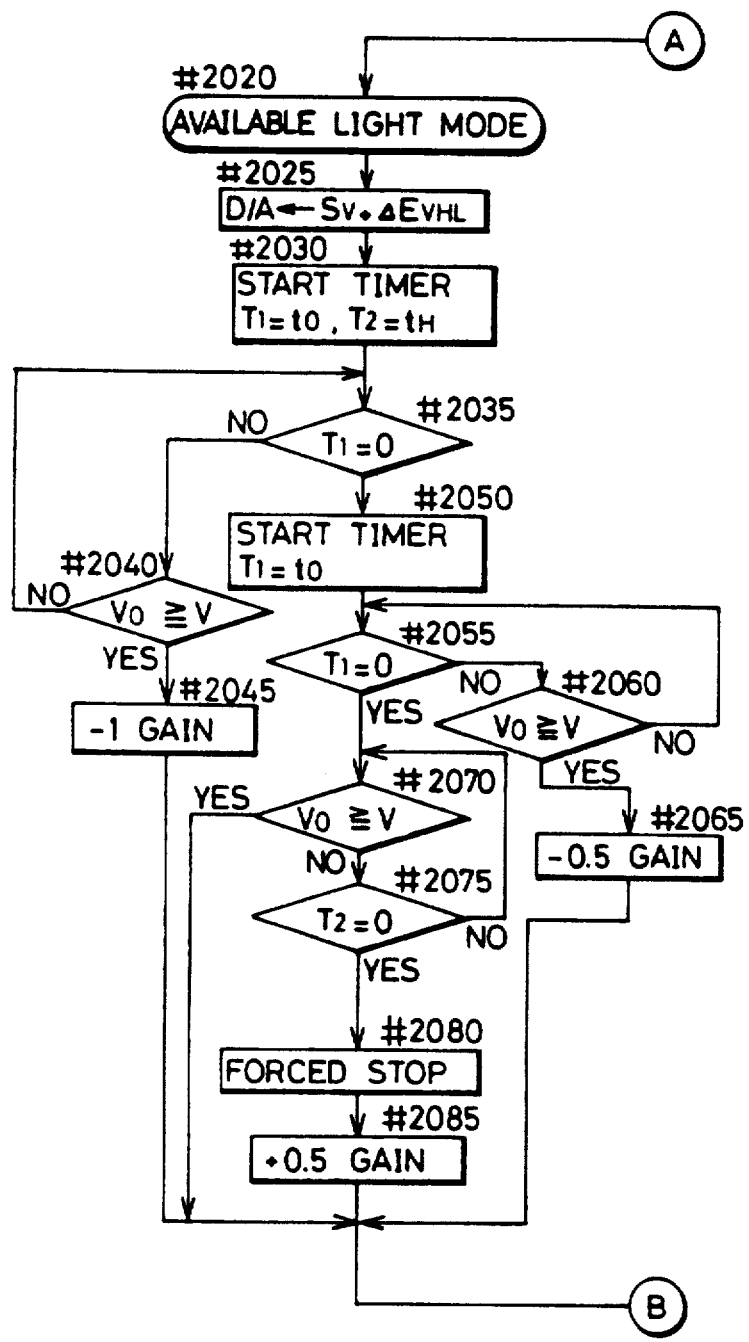
FIGS. 9A, 9B, 9C are flow charts for executing a release process in the flow chart of FIG. 6.
Figure 9B:
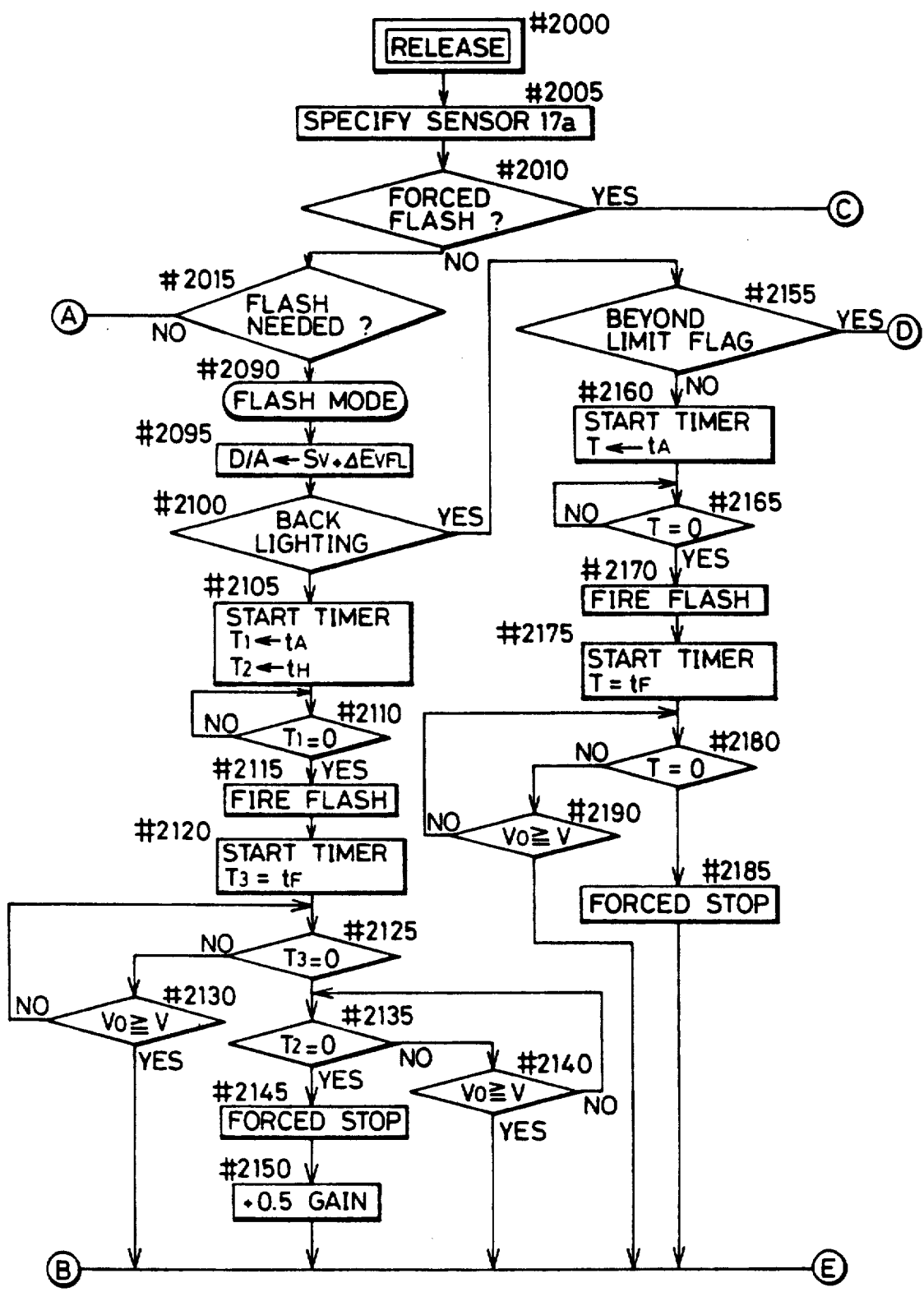
Figure 9C:
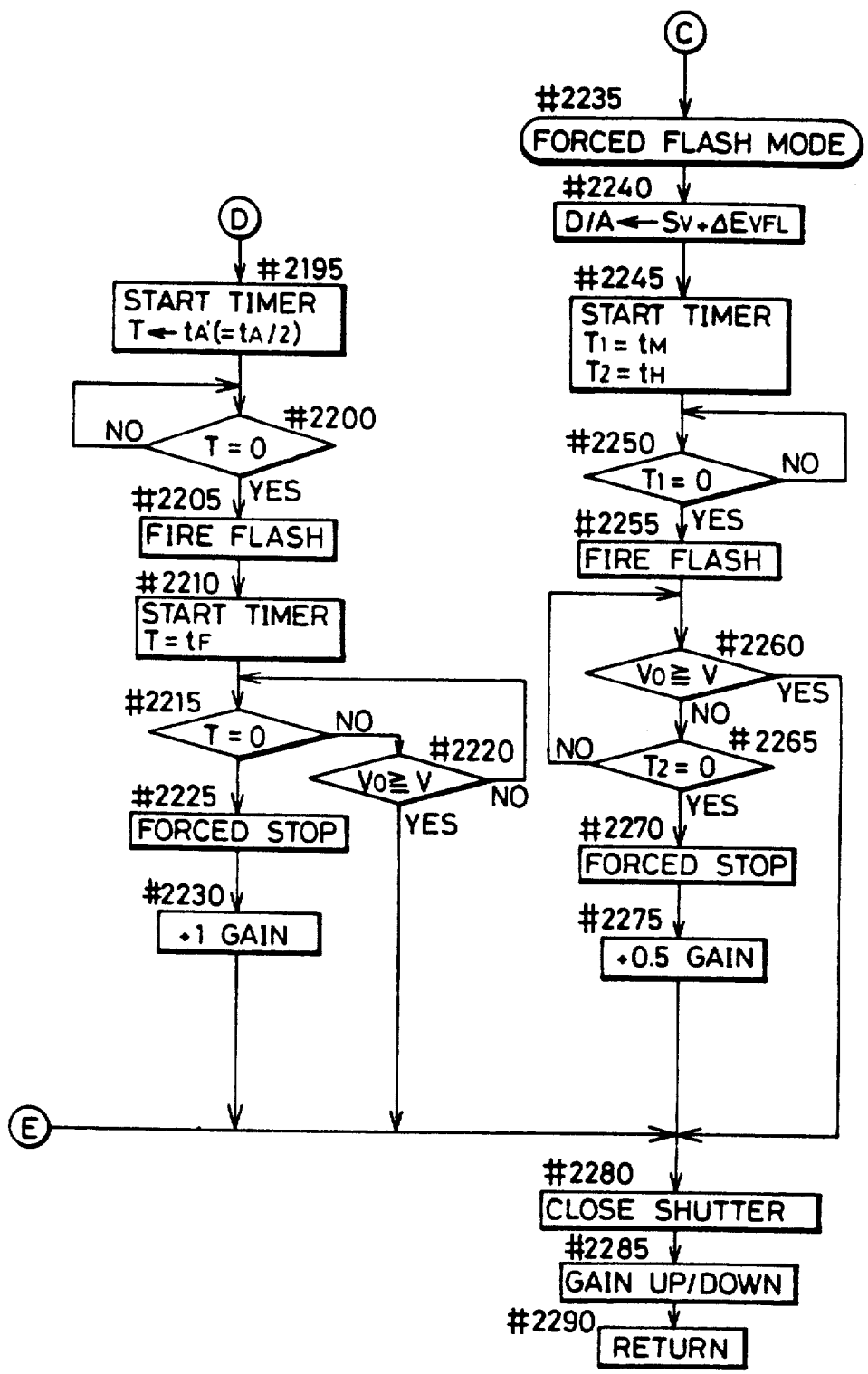

Following the description of the second embodiment which has been completely described, #2000 (i.e., #1005 in FIG. 6), "release" subroutine will be described with reference to FIG. 9. "Release" subroutine includes "available light mode", "flash mode" and "forced flash mode".

First, the switch SW1 is operated to specify the sensor 17a for measuring the luminance of the central spot of the image area to be photographed (#2005) so as to discontinue the exposure of the image pickup device 9 when a proper amount of exposure is obtained for the main object. Next, one of the photographic modes, i.e., "available light mode", "flash mode" and "forced flash mode" is selected in #2010 and #2015. When "forced flash" flag is found to be set in #2010, the sequence proceeds to #2235 to #2275, "forced flash mode" routine (to be described later). If "flash necessary" flag is found to be set in #2015, the sequence proceeds to #2090 to #2230, "flash mode" routine (to be described later). When "flash necessary" flag is not found to be set, the sequence proceeds to #2020-#2085, "available light mode" routine.

When "available light mode" is selected for photography (#2020), the main image luminance correction value ΔEvhl, and the ISO sensitivity Sv as corrected with the value γ for correcting the variation of image pickup sensitivity are fed to the D/A conversion circuit 22h (#2025). Timers T1 and T2 are then set to the value "to", i.e., the highest shutter speed tm (=2^−Tvm) as divided by 2, and the shake limit shutter speed th (=2^−Tvh), respectively to start measuring the specified lengths of time. At the same time, exposure of the image pickup device 9 is initiated (#2030). Next, an inquiry is made as to whether the amount of exposure of the device 9 has reached a proper value until the time interval "to" elapses. Thus, the timer T1 is checked as to whether the count is 0 (#2035). If T1>0, the reference voltage value Vo is compared with the voltage value V (hereinafter referred to as "exposure voltage value") of the capacitor C of the circuit 22i for detecting the amount of charges stored in the device 9 reaching a proper value (#2040). When Vo<V, this indicates that the amount of stored charges has not reached the proper value, so that the sequence returns to #2035, in which the timer T1 is checked again. When Vo≧V, the charge amount has reached the proper value. However, since charges are stored until time tm excessively, a flag is set to correct the gain of the photographed image by −1.0 (#2045). The shutter is closed in #2280, the gain correction value −1.0 is applied to the image processing control circuit 25 in #2285, and the sequence returns to the main routine in #2290.

If it is found that T1=0 in #2035, the timer T1 is set to "to" to start countdown. An inquiry is further made as to whether the amount of exposure of the device 9 reaches the proper value before the lapse of time interval "to" (#2050 to #2060). When the answer is in the affirmative, charges are stored excessively until time tm, so that a flag is set for correcting the gain of the photographed image by −0.5 (#2065), followed by #2280 to #2290 in which the shutter is closed, the gain correction value −0.5 is fed to the circuit 25, and the sequence returns to the main routine. If the amount of exposure of the device 9 does not reach the proper value until the lapse of time "to" (T1=0 in #2055), an inquiry is made as to whether the exposure amount of the device 9 reaches the proper value during the period of "tm" to "th" (#2070 and #2075). More specifically, if Vo≧V (#2070), this indicates that the proper exposure was effected, so that the shutter is closed (#2280). Since there is no need for gain correction, a gain correction value of 0 is fed to the image processing control circuit 25 (#2285), whereupon the sequence returns to the main routine (#2290). If Vo<V, an inquiry is made as to whether T2 =0 (lapse of time th) in #2075. When T2=0, the exposure time of the pickup device 9 is beyond the shake limit, so that the storage of charges in the device 9 is forcibly discontinued (#2080), a flag is set for correcting the gain of the photographed image by +0.5 to compensate for the insufficient exposure (#2085), the shutter is closed (#2280), the gain correction value of +0.5 is fed to the circuit 25 (#2285), and the sequence returns to the main routine (#2290).

"Flash mode" (#2090) will be described next. As in "available light mode", the main object luminance correction value ΔEvhl, and the ISO sensitivity Sv as corrected with the value γ for correcting the variation of image pickup sensitivity are fed to the D/A conversion circuit 22h (#2095). Next, an inquiry is made as to whether "back lighting" flag is set (#2100). If the flag is set, the sequence proceeds to #2155 to #2230, "back lighting" flash mode (to be started later). If otherwise, #2105-#2150 follow for usual flash mode photography.

In the usual flash mode, the timers T1 and T2 are set to the flash firing time ta ($=2^{-Tv}$) and the shake limit shutter speed th, respectively, for the start of countdown, and exposure of the device 9 is initiated at the same time (#2105). The exposure is effected with available light until T1=0 (lapse of time ta), whereupon the flash is fired (#2110-#2115). At the same time, the duration tF of flashlight is set on a timer T3 for starting countdown (#2120). During the duration of flashlight (T3>0), the reference voltage value Vo is compared with the exposure voltage value V. When Vo≧V (#2125 and #2130), this indicates that the amount of exposure of the device 9 becomes proper, so that the sequence proceeds to #2280 to #2290, in which the shutter is closed, a gain correction value of 0 is fed to the control circuit 25 since there is no need for gain correction, and the sequence returns to the main routine. If Vo<V during the duration of flashlight exposure, this indicates that the amount of exposure is less than is proper. An inquiry is then made about whether the amount of exposure of the device 9 becomes proper by the time the shake limit time the elapses (T2=0) after the duration of flashlight (after the lapse of time tF) (#2135 and #2140). If the proper amount of exposure is obtained, #2140, like #2130, is followed by #2280-#2290, wherein the shutter is closed, a gain correction value of 0 is fed to the control circuit 25, and the sequence returns to the main routine. If the proper exposure can not be effected before the lapse of the shake limit time th (T2=0), the storage of charges in the device 9 is forcedly discontinued upon the lapse of time th (#2145), whereupon step #2150 follows to set the flag for correcting the gain of the photographed image by +0.5 to compensate for the under-exposure. #2280 to #2290 then follow to close the shutter, feed the gain correction value +0.5 to the image processing control circuit 25 and resume the main routine.

When "back lighting" flag is found set in #2100 for "back lighting" flash mode photography, an inquiry is made about whether "beyond limit" flag is set (#2155). If the flag is not set, the timer T is set to flash firing time ta (#2160). When the flag is set, the timer T is set to flash firing time ta' ($=ta/2$) (#2195) to start countdown. At the same time, exposure of the sold-state image pickup device 9 is initiated.

If "beyond limit" flag is not set, the flash is fired upon the lapse of flash firing time ta (#2165) in #2170. At the same time, the timer T is set to flashlight duration tF for starting countdown (#2175). If the amount of exposure of the device 9 becomes proper during the flashlight duration (T>0) (#2180, #2190), #2280 to #2290 follow, in which the shutter is closed, a gain correction value of 0 is fed to the circuit 25, and the sequence returns to the main routine. If the proper amount of exposure is not obtained during the duration of flashlight, the charge storage in the device 9 is forcibly discontinued upon the extinction of flashlight (upon lapse of time tf) (#2185), no flag is set for the gain correction of the photographed image, the shutter is closed (#2280), a gain correction value of 0 is fed to the circuit 25 since there is no need for gain correction (#2285), and the sequence returns to the main routine (#2290). In "forced flash mode", #2160 to #2185, the object is photographed against bright background. Accordingly, no correction is made of the gain of the photographed image after the forced interruption of exposure in #2185.

In the case where "beyond limit" flag is set as in the foregoing case where the flag is not set, the flash is fired upon lapse of the flash firing time ta', and the shutter is closed when proper exposure of the device 9 is effected during the duration of flashlight. Since no gain correction is to be made, a gain correction value of 0 is fed to the control circuit 25, whereupon the sequence returns to the main routine (#2200-#2220, #2280-#2290). If proper exposure is not accomplished during the duration of flashlight, the charge storage in the device 9 is forcibly discontinued after the emission of flashlight (#2225), followed by step #2230 to set the flag for correcting the gain of the photographed image by +1.0. The shutter is then closed (#2280), the gain correction value +1.0 is fed to the circuit 25 (#2285), and the sequence returns to the main routine (#2290). In "beyond limit" "back lighting flash mode", #2195 to #2230, the exposure time with available light is made one-half of the exposure time ta for "back lighting flash mode" photography, with the result that #2225, forced stop of exposure, is followed by +1.0 correction of the gain of the photographed image.

Next, "forced flash mode" (#2235) will be described. First, the main object luminance correction value ΔEvfl, and the ISO sensitivity Sv as corrected with the image pickup sensitivity correction value γ are fed to the D/A conversion circuit 22h (#2240). The timer T1 and the timer T2 are then set to the highest shutter speed tm and the shake limit shutter speed th, respectively, to start countdown. As the same time, exposure of the device 9 is also initiated (#2245). Upon lapse of the highest shutter speed time tm (T1=0), the flash is fired (#2250-#2255). An inquiry is made about whether the amount of exposure of the device 9 reaches a proper value by the time the shake limit time th elapses (T2=0) (#2260-#2265). If the answer is in the affirmative, the shutter is closed (#2280), a gain correction value of 0 is fed to the circuit 25 since no gain correction is to be made (#2285), and the sequence returns to the main routine. If otherwise, the charge storage in the device 9 is forcibly discontinued upon the lapse of the shake limit time th (T=0) in #2270. The flag for correcting the photographed image gain by +0.5 is set to compensate for the underexposure (#2275), whereupon the shutter is closed (#2280), the gain correction value +0.5 is fed to the image processing control circuit 25 (#2285), and the sequence returns to the main routine (#2290).

The release subroutine has been described.

To provide a compacted camera at a reduced cost, the flashlight emission stopping circuit for controlling the amount of light emission is dispensed with according to the foregoing embodiment, permitting the flash to emit its light completely at all times. For savings in power, however, the flash is held out of operation when the exposure is completed According to the invention described, the luminance of the object in the image area to be photographed is first measured, and a specified period of time during which the solid-state image pickup device is to be exposed to available light is calculated. Simultaneously with the start of exposure, the light from the object is measured, the flash is fired for photography after the device has been exposed to available light for the specified time period, and the exposure is discontinued when a proper amount of exposure is obtained as to the main object. Consequently, the flashlight can be controlled accurately concurrently with the measurement of available light. This facilitates shutter control to assure proper exposure at all times even for objects with widely varying luminance values. Furthermore, a proper luminance balance can be easily held, for example, between the main object and the background, i.e., the subobject to produce photographs reflecting the available atmosphere of the scene in conformity with the condition involved.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. An electric still video camera comprising:
   photography means having video signal production means for producing a video signal with respect to an object;
   color balance adjustment means for fixedly adjusting the color balance of the video signal of said video signal production means to a color balance for daylight;
   judge means for judging as to whether an object is able to be photographed without flash light, wherein said judge means includes information output means for outputting information concerning the color balance of the object, and judges that flash light is necessary when the information indicates that the color balance of the object is deviated from the color balance for daylight; and
   flash firing means for firing flash light having color balance which is suitable for the color balance adjusted by said color balance adjustment means when said judge means judges that flash light is necessary.

2. An electronic still video camera comprising:
   information output means for outputting information concerning the color balance of an object;
   judge means for judging as to whether the color balance of the object is deviated from a color balance for daylight; and
   flash control means for issuing a flash firing signal when said judge means judges that the color balance of the object is deviated from the color balance for daylight.

3. An electronic still video camera comprising:
   photography means having video signal production means for producing a video signal with respect to an object;
   a color balance adjustment device for adjusting the color balance of the video signal of said video signal production means;
   a flash device for firing flash light;
   mode change means for changing the photography mode from a first photography mode to a second photography mode and vice versa;
   information output means for outputting information concerning the color balance of the object;
   a judge device for judging as to whether flash light is necessary:
   flash control mans for permitting the flash firing of said flash device when the photography mode is set in the first photography mode and said judge device judges that flash light is necessary, prohibiting the flash firing when said judge device judges that flash light is not necessary, and prohibiting the flash firing regardless of the judgment of said judge device when the photography mode is set in the second photography mode;
   a color balance control device for controlling said color balance adjustment device so as to fixedly adjust the color balance of the video signal to a color balance for daylight when the photography mode is set in the first photography mode, and controlling said color balance adjustment device so as to change the color balance of the video signal according to the information from said information output means when the photography mode is set in the second photography mode.

* * * * *